US011175174B2

(12) United States Patent
Stirling et al.

(10) Patent No.: US 11,175,174 B2
(45) Date of Patent: Nov. 16, 2021

(54) SENSOR, A SENSOR SYSTEM, AND A METHOD OF SENSING IN A FLOATATION TANK

(71) Applicant: Binmartine PTY LTD, Victoria (AU)

(72) Inventors: Robert Sidney Stirling, Victoria (AU); Ravi Vivakanantham, Victoria (AU)

(73) Assignee: Binmartine Pty Ltd, Surrey Hills (AU)

(*) Notice: Subject to any disclaimer, the term of this patent is extended or adjusted under 35 U.S.C. 154(b) by 85 days.

(21) Appl. No.: 14/764,239

(22) PCT Filed: Jan. 29, 2014

(86) PCT No.: PCT/AU2014/000055
§ 371 (c)(1),
(2) Date: Jul. 29, 2015

(87) PCT Pub. No.: WO2014/117213
PCT Pub. Date: Aug. 7, 2014

(65) Prior Publication Data
US 2015/0377683 A1    Dec. 31, 2015

(30) Foreign Application Priority Data

Jan. 29, 2013    (AU) ............................... 2013900270

(51) Int. Cl.
*G01F 23/296*    (2006.01)
*B03D 1/02*    (2006.01)

(52) U.S. Cl.
CPC ........... *G01F 23/296* (2013.01); *B03D 1/028* (2013.01); *G01F 23/2961* (2013.01); *G01F 23/2965* (2013.01); *G01F 23/2968* (2013.01)

(58) Field of Classification Search
CPC .. G01F 23/296; G01F 23/2961; G01F 1/7082; G01F 23/28; G01F 23/282
See application file for complete search history.

(56) References Cited

U.S. PATENT DOCUMENTS 5,563,845 A * 10/1996 Walsh ................ G01F 23/2965
367/7
5,569,844 A    10/1996 Sowerby
(Continued)

FOREIGN PATENT DOCUMENTS

CN    1386196    12/2002
CN    101035681 A    9/2007
(Continued)

OTHER PUBLICATIONS

Australian Patent Office, International Search Report, International Application No. PCT/AU2014/000055, which is an AU counterpart to the instant application, dated Apr. 17, 2014.
(Continued)

*Primary Examiner* — Jennifer Bahls
*Assistant Examiner* — Quang X Nguyen
(74) *Attorney, Agent, or Firm* — Gregory A. Walters; Walters IP Law

(57) ABSTRACT

A sensor (1) including at least one array (10), including a plurality of acoustic transducers (12); a controller (42) for controlling each transducer (12) to be selectively in a generation mode for generating an analysis signal, or a reception mode for receiving an analysis signal, and, for controlling the sensor (1) to perform scans of the at least one array (10), each scan having a plurality of scan steps, such that, during each scan step, at least one transducer (12) is in the generation mode and at least one other transducer (12) is in the reception mode; and, a processor (44) for processing one or more signals receivable from one or more of the controller (42), a transducer (12) in generation mode and a transducer (12) in reception mode to determine at least one characteristic from the one or more signals.

43 Claims, 29 Drawing Sheets

(56) References Cited

U.S. PATENT DOCUMENTS

| | | | |
|---|---|---|---|
| 6,321,604 B1* | 11/2001 | Jackson | G01F 1/24 |
| | | | 250/208.1 |
| 6,581,459 B1 | 6/2003 | Lichtenfels, II | |
| 6,837,098 B2 | 1/2005 | Gysling et al. | |
| 7,426,852 B1 | 9/2008 | Rothman | |
| 7,503,217 B2 | 3/2009 | Johansen | |
| 2005/0055136 A1 | 3/2005 | Hofmann et al. | |
| 2006/0178581 A1 | 8/2006 | Africk et al. | |
| 2006/0192679 A1* | 8/2006 | Buckley | A01G 27/008 |
| | | | 340/618 |
| 2010/0257931 A1 | 10/2010 | Partington et al. | |

FOREIGN PATENT DOCUMENTS

| | | |
|---|---|---|
| CN | 102506961 | 7/2013 |
| EP | 0745833 | 12/1996 |
| EP | 0853236 A1 | 7/1998 |
| WO | 0210739 | 2/2002 |
| WO | 03012379 | 2/2003 |
| WO | 2007142933 A2 | 12/2007 |

OTHER PUBLICATIONS

Australian Government IP Australia, Examination Report No. 1 for Standard Patent Application, Application No. 2014213002, entire document, which is an AU counterpart to the instant application, dated Feb. 10, 2017.

European Patent Office, Extended European Search Report, Application No. Patent No. 14746730.2-1553 / 2951570 PCT/AU2014000055, entire document, which is an EP counterpart to the instant application dated Oct. 20, 2016.

Mexican Patent Office, first Office action, Mexican Patent Application MX/a/2015/009771, entire document, which is an MX counterpart to instant application, dated Apr. 5, 2017.

Resolucion De Notificacion Del Informe Pericial (Ley Nueva), Tip / Nro Solicitud: Patente de invencion: PCT 2015-002129, entire document, which is an MX counterpart to the instant application, dated May 8, 2017.

State Intellectual Property Office, Office Action and Search Report from Counterpart Chinese Application 201480018164.5, dated Apr. 26, 2017.

Stolojanu, V. et al., "Characterization of slurry systems by ultrasonic techniques", Chemical Engineering Journal 84 (2001), p. 215-222.

PCT International Preliminary Report on Patentability for PCT International Application No. PCT/AU2016/000394, dated Jun. 12, 2018, 5 pages.

Chinese Search Report and Office Action for Chinese Patent Application 201910829014.7 dated Jun. 15, 2020, 12 pages.

Mexican Examination Report for Mexican Patent Application MX/a/2017/014983, dated Jul. 28, 2020, 6 pages.

European Examination Report for European Patent Application 14746730.2 dated Nov. 20, 2020, 4 pages.

Chilean Examination Report for Chilean Application No. 201801527, dated Apr. 16, 2020, 24 pages.

United States Office Action for U.S. Appl. No. 16/004,038, dated Apr. 1, 2020, 11 pages.

* cited by examiner

SENSOR, A SENSOR SYSTEM, AND A METHOD OF SENSING IN A FLOATATION TANK

FIELD OF THE INVENTION

The present invention relates to a sensor, a sensor system and/or a method of sensing, which may be useful for mining applications. Further, the invention may be particularly useful where it is desired to ascertain levels of various substances in a flotation cell/flotation tank.

BACKGROUND OF THE INVENTION

In the mining industry, it has been desired to be able to measure the level of substances in, for example, a flotation cell or flotation tank. This measurement has presented various problems, such as:

The slurry/pulp level is positioned below a heavy froth layer;
The froth layer contains recovered metal in suspension which builds up on any intrusive objects, including instruments for measuring;
The slurry/pulp liquid also contains material that can adhere to anything intrusive, which may include scaling and other types of build-up;
The density of the slurry/pulp and the froth changes as the ore body being processed changes;
The dielectric of the slurry/pulp is subject to change, which results in great difficulty in using electrical properties if consistent measurement of the slurry/pulp is desired.

It has been desired to obtain a sufficiently accurate level measurement of the slurry/pulp, because if the slurry/pulp overflows the launders of the flotation cell/flotation tank, contamination of the froth concentrate in the concentrate thickener will require expensive remediation costs, which may include further processing of the concentrate.

It has also being desired to measure the froth density, as this is an important feedback variable. If the froth density becomes too high, the froth will collapse back on itself, resulting in a failure of the process. Previously, this has monitored either by an operator, or in some cases, by a camera. However, employing a human operator is expensive, and can be prone to human error. Further, a camera can only detect that froth is not overflowing the launder, but it cannot predict the eventual collapse of the froth due to density increase.

Additionally, froth movement may also be important to know. It is usually monitored by an operator, but 3-D cameras have also been used to provide such information. Due to the flotation cell/flotation tank being aerated and agitated, the froth can move, even if it is not flowing over the launder.

Moreover, it may also be desired to know the froth height, as this can be an important feedback indicator for the operating efficiency of the flotation cell/flotation tank. The flotation cell/flotation tank may only work efficiently when there is froth recovery over the launder.

Previously, in order to determine some of the desired information/parameters/operating conditions of mining processes, there have been various techniques and instruments used, all of which have problems.

One technique to measure the slurry/pulp height in a flotation cell/flotation tank is to use a displacement float. A displacement float is either metal or plastic, and is weighted to float on the slurry, and other than the froth. The float comprises a ball, which has a rod attached in the vertical, with a target plate attached to top of the rod. As the slurry/pulp level changes, the target is monitored by an ultrasonic level transmitter, which is mounted above the target as a height that will allow for liquid level change of the flotation cell/flotation tank. The displacement float has physical characteristics which change as build-up occurs. Further, mechanical wear for a displacement float is a problem and occurs at a high rate, as the flotation cell/flotation tank is aerated and agitated. Another problem with displacement floats is that they sometimes stick in position. These problems cause high maintenance costs and high operation costs, with failures of the displacement float leading to costly errors and/or shutdowns of the mining processing.

An alternative to the above described displacement float is to use a rheostat feedback, rather than employing an ultrasonic transmitter. However, many, if not all of the same problems are found to occur with this particular alternative.

Yet another previous solution was to use a pressure transmitter (also known as a bubbler tube). However, this technology is affected by density change in the slurry/pulp. Accordingly, a pressure transmitter produces a low level of accuracy. Furthermore, the pipes of the pressure transmitter are prone to blocking up, which requires constant purging. In this regard, the pressure transmitter technology does not provide sufficiently reliable information and it requires constant maintenance, which leads to further expense and loss of productivity in the mining processes.

Yet another technology for measuring the slurry/pulp uses a conductivity probe (or probes). However, conductivity probes are readily affected by dielectric change which, as noted above, is a characteristic of the slurry/pulp, or other substances in a flotation tank. A greater weakness of conductivity probes is the build-up on those probes during the normal processes of operating a tank flotation cell/flotation tank. A more-recent development of conductivity probes uses feedback monitoring of the voltage signal between the probe and the wall of the flotation cell/flotation tank. However, such conductivity probes also have problems if build-up is excessive and also if the build-up is left to dry on the probe. In this situation, the build-up may produce an insulating characteristic (low dielectric constant) and the probe will cease to function. Such unreliability is unacceptable for expensive mining processes.

Presently, the mining industry may benefit from increase automation of ore processing, and relatively little automatic processing is currently employed. Most currently-employed processes, using technology and instrumentation as exemplified above, require operators to constantly monitor and clean the instruments due to scaling. A lack of automation and employing expensive, fallible human operators is leading to costly and unreliable mining processing.

It is an object of the present invention to overcome, or at least ameliorate, at least one of the above-mentioned problems in the prior art, and/or to overcome, or at least ameliorate, at least one problem in the prior art, which has not been mentioned above, and/or to provide at least a useful alternative to prior art devices, systems and/or methods.

SUMMARY OF THE INVENTION

In accordance with one aspect, the present invention provides a sensor for determining at least one characteristic of at least one substance, the sensor including: at least one array, each array including a plurality of acoustic transducers with a proximal-most transducer and a distal-most transducer; a controller: for controlling each transducer to be selectively in a generation mode for generating an analysis signal, or a reception mode for receiving an analysis signal transmitted through and/or reflected from one or more of the plurality of substances to produce an output signal, and, for controlling the sensor to perform scans of the at least one array, each scan having a plurality of scan steps, such that, during each scan step, at least one transducer from any of the at least one array is in the generation mode and at least one other transducer from any of the at least one array is in the reception mode; and, a processor for processing one or more signals receivable from one or more of the controller, a transducer in generation mode and a transducer in reception mode to determine the at least one characteristic from the one or more signals.

In another aspect, the present invention provides a sensor system for determining at least one characteristic of each of a plurality of substances in a flotation tank, wherein each of the substances comprises a layer in the flotation tank, wherein each layer has at least one interface with an adjacent layer, and wherein each interface has a changeable height in the flotation tank, the sensor system including: at least one array located within and/or near within the interior of the flotation tank, each array including a plurality of acoustic transducers with a proximal-most transducer and a distal-most transducer; a controller: for controlling each transducer to be selectively in a generation mode for generating an analysis signal for transmission towards at least one substance located in front of the transducer in the flotation tank, or a reception mode for receiving an analysis signal transmitted through and/or reflected from one or more of the plurality of substances in the flotation tank to produce an output signal, and, for controlling the sensor to perform scans of the at least one array, each scan having a plurality of scan steps, such that, during each scan step, at least one transducer from any of the at least one array is in the generation mode and at least one other transducer from any of the at least one array is in the reception mode; and, a processor for processing one or more signals receivable from one or more of the controller, a transducer in generation mode and a transducer in reception mode to determine the at least one characteristic from the one or more signals.

In a further aspect, the present invention provides a method of sensing for determining at least one characteristic of at least one substance, the method including: in a sensor including at least one array of acoustic transducers controlling each transducer to be selectively in a generation mode for generating an analysis signal, or a reception mode for receiving an analysis signal transmitted through and/or reflected from one or more of the plurality of substances to produce an output signal, and, controlling the sensor to perform scans of the at least one array, each scan having a plurality of scan steps, such that, during each scan step, at least one transducer from any of the at least one array is in the generation mode and at least one other transducer from any of the at least one array is in the reception mode, processing one or more signals receivable from one or more of the controller, a transducer in generation mode and a transducer in reception mode to determine the at least one characteristic from the one or more signals.

SUMMARY OF OPTIONAL EMBODIMENTS OF THE INVENTION

In an embodiment, the controller is further adapted to control each transducer to be selectively in a cleaning mode for generating a signal which forms cavitation in one or more of the at least one substance, such that, if one or more of the substances has accumulated on and/or near the transducer, the cavitation removes at least some of the accumulation from on and/or near the transducer. In this regard, the pulse amplitude of the signal is great enough to cause a phenomenon called "rarefaction", which in turn causes cavitation. The cavitation may result in a substance dissolving, if it is a substance soluble in the medium of the flotation tank (usually water), and if the cavitation energy is sufficient to effect such dissolving. The cavitation may result in a substance being displaced, if it is not soluble in the medium, for example: oils, grease and scale.

It will be understood that the controller being adapted for a given task encompasses the controller being programmable, or being programmed. The programming may occur subsequent to manufacture, say, by a user of the sensor. Alternatively, the programming could be done during manufacture, and could, for example, include an EPROM chip or the like.

In another embodiment, one of the one or more signals receivable by the processor is a signal from either the controller or a transducer in generation mode indicating the transducer is in generation mode and generating an analysis signal, wherein one of the one or more signals receivable by the processor is a signal from either the controller or a transducer in reception mode indicating the transducer is in reception mode and able to receive an analysis signal, wherein one of the one or more signals receivable by the processor is an output signal from a transducer in reception mode, and, wherein one of the one or more signals receivable by the processor is a signal from a transducer in generation mode indicating the transducer is producing ring-down.

A characteristic of a substance will be understood to be one or more attributes of a signal from a component of the sensor. In some circumstances the characteristic of a substance will be understood to include attributes of signals from different components in the sensor. Example characteristics include, for example:

amplitude of a signal produced by a transducer in reception mode;

frequency of a signal produced by a transducer in reception mode;

ring-down signal produced by a transducer in generation mode; and, no signal produced by a transducer in reception mode, along with a signal from either a transducer in generation mode or a signal from the controller that a pulse (analysis) signal has been produced, along with other attributes of signals receivable by the processor, where those attributes are indicative of a property of the respective substance. Properties of substances producing characteristics include, for example:

height of a substances in a flotation tank;

height of an interface between substances in a tank;

density of a substance; and, velocity/speed of a substance.

In a further embodiment, one or more of the at least one array is a single line of transducers.

In an optional embodiment, one or more of the at least one array includes at least two parallel lines of transducers, and wherein transducers in one line are positioned offset with respect to transducers in the one or more other lines.

In another optional embodiment, the offset is at least a half width of a transducer. There may also be four (4) parallel lines of transducers in such an array, where the offset of the second line could be a quarter width of a transducer from the first line, the offset of the third line could be a quarter width of a transducer from the second line, and the offset of the fourth line could be a quarter width of a transducer from the third line—the third and fourth lines, respectively, offset by a half width of a transducer and three quarters width of a transducer from the first line of transducers in the array. In this way, the at least one array of transducers can be configured for greater accuracy and/or precision of measurement of properties of the substances.

In a further optional embodiment, the at least one array includes at least one primary array and at least one secondary array having transducers positioned opposite and facing transducers of the at least one primary array. In this arrangement, the transducers of the primary array can transmit signals to transducers in the secondary array, and vice versa. Such an arrangement could be useful for attaining signals (or attributes of those signals) being characteristic for determining (or measuring) properties such as density and/or velocity/speed of movement of a substance, but the arrangement may also be useful for attaining signals (or attributes of those signals) being characteristic for determining the height of a particular substance in the flotation tank. The secondary array(s) are also controlled by the controller and provide signals to the processor. It is envisaged that the controller and processor are connected by a bus to each array, such that the sensor is arbitrarily extendible and configurable. In an embodiment having opposing arrays, the bus might use, for example, a ribbon-like connector for transmitting data between primary and secondary arrays, and the controller and processor. The primary and secondary arrays can be mounted on an appropriate support means, which may allow for adjustment (including precision adjustment) of the relative positions of the primary and secondary arrays.

In yet another embodiment, the at least one primary array is longer than the at least one secondary array. In this arrangement, clearly only some of the transducers in the primary array will transmit analysis signals to transducers in the secondary array. The secondary array could also be an array with multiple parallel lines of transducers offset from each other, as described above.

In yet a further embodiment, the at least one secondary array is located at or near a proximal-most transducer of the at least one primary array.

In one embodiment, a first secondary array is located at or near a proximal-most end of the at least one primary array and a second secondary array is located at or near a distal-most end of the at least one primary array. There is also contemplated an embodiment with proximal and distal secondary arrays, along with a number of intermediately located secondary arrays.

In another embodiment, the at least one array includes a plurality of arrays connectable with each other to form an extended array with a proximal-most transducer and a distal-most transducer.

In yet another embodiment, the controller is further adapted to control each scan step such that only one transducer is in the generation mode. Further, in such embodiment, the controller may control the array to allow only transducers immediately adjacent the transducer in generation mode to be in reception mode. Alternatively, a number of adjacent transducers could be allowed to be in reception mode, or all other transducers could be in reception mode for the at least one array.

The controller can also be programmed to allow a primary array to have transducers either singly or multiply in generation mode, whilst controlling one or more secondary arrays to be in reception mode, and vice versa. It will be appreciated that there are many configurations of arrays, each having a large variety of operating patterns, each operating pattern including one or more scans, each scan having scan steps wherein selected one or more transducers are in generation mode and one or more transducers are in reception mode. The patterns being adaptable to the needs of determining characteristics of one or more substances, for example, in flotation tanks.

In one example embodiment, with a simple single linear array (see, for example, FIG. 1), the pattern may include two types of alternating scan: a distal to proximal scan, followed by a proximal to distal scan, the two scans being repeated an arbitrary number of times. For example, the distal to proximal scan has a first scan step wherein the distal-most transducer is in generation mode and the immediately adjacent proximal transducer is in reception mode, while all other transducers are turned off or inactive (that is, neither in generation mode or reception mode). The second scan step has the second-to-distal-most transducer (the one which was previously in reception mode) being in generation mode, while the distal-most transducer and the adjacent proximal transducer (the third-to-distal-most transducer) are both in reception mode. Such scan steps are repeated until each transducer in the array has been once in generation mode. It will be understood that, when the proximal-most transducer is in generation mode, only the adjacent distal transducer will be in reception mode. After the distal to proximal scan, the pattern then reverts to the proximal to distal scan, being substantially opposite scan steps of the distal to proximal scan.

In a further embodiment, the controller is further adapted to control each scan to be in order from the proximal-most transducer in generation mode to the distal-most transducer in generation mode. It will be understood that the terms distal and proximal have been used to provide relative positioning in the array of the transducers. In some embodiments, distal may be top and proximal may be bottom (or vice versa), if the array is substantially vertically oriented. In other embodiments, distal may be left and proximal may be right (or vice versa, and depending on point-of-view of an observer), if the array is substantially horizontally oriented. If the array is oriented at an angle, then distal may represent a transducer in an upper right position and proximal may represent a transducer at the opposite end of the array in a lower left position.

In yet a further embodiment, the controller is further adapted to control each scan step such that the at least one other transducer in reception mode includes at least one transducer adjacent a transducer in generation mode.

In an optional embodiment, the controller is further adapted to control each scan step such that the at least one other transducer in reception mode includes one proximal adjacent transducer and one distal adjacent transducer to a transducer in generation mode, wherein, when the proximal-most transducer is in generation mode only the one distal adjacent transducer is in reception mode, and wherein, when the distal-most transducer is in generation mode only the one proximal adjacent transducer is in reception mode.

In another optional embodiment, the controller is further adapted to control each scan to include sufficient scan steps such that, during the scan, each of the transducers is at least once in a generation mode and at least once in a reception mode. As mentioned above, this embodiment represents only one of many possible scans that can be programmed into the controller.

In a further embodiment, the at least one array is arranged vertically in the flotation tank, such that the proximal-most transducer comprises a top-most transducer and the distal-most transducer comprises a bottom-most transducer, and wherein, when the flotation tank is in normal operation, the top-most transducer is in a top-most layer and the bottom-most transducer is in a bottom-most layer. Normal operation for a flotation tank is typically where a liquid (that is, the pulp/slurry of metal ores and other substances in water) is flowing through, say, dart valves into the tank, the liquid is being agitated (for example, by an impeller), or aerated (for example, by aeration tubes connected to the tank) so as to produce froth, and the froth height is such that launders spill over the tank spout, but not so high so as to spill over the tank sides. Ideally, this should be a continuous process, so as to result in efficient processing. In the above, the liquid is the bottom layer, the froth is the intermediate layer and air is the top layer.

In yet a further embodiment, the plurality of substances in the layers include: a liquid substance in a bottom-most layer, a froth substance in an intermediate layer and a gaseous substance in a top-most layer, such that the interfaces include: a liquid layer/froth layer interface, and a froth layer/gaseous layer interface. It will be appreciated that one of the benefits of the presently described device, system and method is that the heights of the interfaces can be determined with sufficient accuracy and/or precision, so as to provide useful information to an operator of the flotation tank. The operator may be located geographically close to the tank, or a number of tanks, say in an operations room, or may be located geographically remotely, say, in another part of the world. In either case, the operator needs the accurate and/or precise feedback in a timely manner to be able to determine that a flotation tank (or number of flotation tanks) is working properly, efficiently and being productive.

In other embodiments, it is contemplated that the sensor, sensor system and sensing method can be arranged so as to give feedback of characteristics of the substances in the layers of the flotation tank directly to automated input means. In this regard, the processor may be configured to send information to a controller for controlling, say: dart valves, which regulate flow of liquid into the flotation tank; agitators (including impellers located in the tank); or, aerators (including aeration tubes connected to the tank), or any other devices regulating or controlling the operation of the tank. In this regard, the flotation tank can be made autonomous or semi-autonomous.

In an optional embodiment, the liquid layer is a slurry or a pulp containing at least one mineral, the froth layer contains, in suspension, a more refined mineral than in the liquid layer recovered from the mineral in the liquid layer, and the gaseous layer is air, and wherein, in operation, the liquid layer is agitated and/or aerated such that bubbles ascend there-through to create the froth layer. The flotation tank could be used for processing various products from mining and other geological extraction methods, such as: copper, molybdenum, gold, silver, lead, nickel, iron ore, coal, potash, oil and oil sands, gypsum and many other substances. However, it is also contemplated that the sensor, sensing system and sensing method could be applied to other processes outside of minerals processing, such as food or beverage production or other types of manufacturing where acoustic sensing can provide an advantage over other types of sensing.

In another optional embodiment, the at least one array is arranged horizontally in the flotation tank, such that, when the flotation tank is in normal operation, the at least one primary array is in the liquid layer and the at least one secondary array in the froth layer.

In yet another optional embodiment, the at least one array is adapted to be tilted at a selected angle from horizontal or moved between horizontal and the selected angle, such that, when the flotation tank is in normal operation, a proximal-most transducer of the at least one primary array is in the liquid layer, a proximal-most transducer of the at least one primary array is in the froth layer, a proximal-most transducer of the at least one secondary array is in the froth layer, and a distal-most transducer of the at least one secondary array is in the gaseous layer. In this way, the sensor can be used to measure froth height accurately. For example, the characteristic of air determinable by the sensor is quite different to the characteristic of froth determinable by the sensor. Air will produce a ring-down signal in a transducer in generation mode, while froth will attenuate a signal so that transducers in reception mode will receive no signal or only a very weak signal, but the froth will not produce the ring-down which is a characteristic of the air. Further, the liquid will produce a strong signal (a signal with a relatively large amplitude), which is its characteristic. Such characteristic responses of the transducers (that is, the attribute(s) of the signal(s) they produce) in the various substances allow the processor to determine which transducer is in which substance, and therefore allows the processor to determine the height of the substance (or the substances interfaces) in the flotation tank by reference to the known height of the transducer in the array, given the arrays position in or above the flotation tank.

In a further optional embodiment, when the processor receives an output signal at or near a first predetermined amplitude from a transducer in reception mode, the processor determines the output signal have a characteristic indicative of the liquid layer, and wherein the processor is configured to output an indicator that the transducer is located in the liquid layer. The predetermined amplitude may be known for the liquid or may be calibrated when a sensor is installed. Further, it is an embodiment that the sensor includes automatic calibration or remote calibration, so that the sensitivities of the transducers can be controlled to account for various different liquids (that is liquids containing different materials), or liquids where the material content can differ depending on the ore body being processed at the time.

In yet a further optional embodiment, when the processor receives an indicator that a transducer is generating an analysis signal, and receives an indicator that another transducer is in reception mode and able to receive the analysis signal, and receives either no output signal or an output signal at or near a second predetermined amplitude from the transducer in reception mode, the processor determines the signals to have a characteristic distinguishing of the froth layer, and wherein the processor is configured to output an indicator that at least one of the transducers is located in the froth layer. As for the transducers in the liquid layer, transducers in the froth layer can be calibrated as needed to account for different types of expected froth, or can be automatically calibrated, say, for changeable froth resulting from changeable ore bodies. It will be appreciated that, for most substances, the attribute of the received signal (if any) in the froth layer will be that it is of lower amplitude than a signal in the liquid layer. However, for a substance such as copper (Cu), the signal in the froth may have a higher amplitude than a signal in the liquid layer.

In one embodiment, when the processor receives an indicator that a transducer in generation mode is producing a ring-down signal, the processor determines the signal to have a characteristic distinguishing of the gaseous layer, and wherein the processor is configured to output an indicator that at least one of the transducers is located in the gaseous layer.

In another embodiment, during a scan step, the processor receives an indicator that a first transducer is generating an analysis signal, and receives an output signal having a first predetermined amplitude from a higher adjacent transducer to the transducer generating the analysis signal; and, during a subsequent scan step, the processor receives an indicator that the higher adjacent transducer is generating an analysis signal and receives either no output signal or an output signal at a second predetermined low amplitude from the first transducer, the processor determines the signals to have a characteristic distinguishing of the liquid layer/froth layer interface, and wherein the processor is configured to output an indicator that the transducers are located about the liquid layer/froth layer interface.

In a further embodiment, during a scan step, the processor receives an indicator that a first transducer is generating an analysis signal, and receives an output signal having a first predetermined amplitude from a lower adjacent transducer to the transducer generating the analysis signal; and, during a subsequent scan step, the processor receives an indicator that the lower adjacent transducer is generating an analysis signal and receives either no output signal or an output signal at a second predetermined amplitude different from the first transducer, the processor determines the signals to have a characteristic distinguishing of the liquid layer/froth layer interface, and wherein the processor is configured to output an indicator that the liquid layer/froth layer interface is located at a height median the two transducers.

It will be appreciated that there may be modulation of (waves in) one or more of the substances in the flotation tank due to the aeration and agitation. In embodiments, this may be accounted for by an averaging function to determine heights of substances or substance interfaces in the tank.

the array is a longitudinal array, and may be an array of a single line of transducers. The array may also have a top-most transducer and a bottom-most transducer.

In another embodiment, the array is connectable with another like array, or other like arrays, to form an extended array. The extended array may have a top-most transducer and a bottom-most transducer. In the extended array, the top-most transducer will be the top-most transducer in the top-most array component, likewise, the bottom-most transducer in the extended array will be the bottom-most transducer in the bottom-most array component.

In an extended array embodiment, the controller controls the scan for all the array components, and each of the transducers in each of the array components in the extended array transmits an output signal for processing to the processor.

In yet another embodiment, during each scan step, the at least one other transducer in reception mode includes at least one transducer adjacent the one transducer in generation mode. Further, the at least one other transducer in reception mode may include one lower adjacent transducer and one higher adjacent transducer to the one transducer in generation mode. However, it will be appreciated that in such an embodiment, when the top-most transducer is in generation mode, only the one lower adjacent transducer is in reception mode. Similarly, in such an embodiment, when the bottom-most transducer is in generation mode, only the higher adjacent transducer is in reception mode.

The froth substance may be a froth suspension containing metal recovered from the metal ore, wherein the metal is in suspension in the froth. It will be appreciated, that the metal may not be entirely purified when suspended in the froth, and would therefore consist of metal and impurities.

There may also be a layer of gaseous substance. Often such gaseous substance will simply be air, though there may be other gases in the air emanating from the froth when the froth bubbles break and emit their internal gases. In applications where there is an explosive environment, air may be replaced with nitrogen so as to lessen the risk of explosion.

Where there is a liquid layer, a froth layer and a gaseous layer, the liquid layer will be a bottom layer, the froth layer will be an intermediate layer and the gaseous layer will be a top layer. In this arrangement there are interfaces, including an interface between the liquid layer and the froth layer, and an interface between the froth layer and the gaseous layer. Each interface will have a certain height in the flotation tank/flotation cell.

In one embodiment, the liquid layer is agitated and aerated in the flotation tank, such that bubbles ascend through the liquid layer to produce the froth layer.

In another embodiment, when the one transducer in generation mode transmits the acoustic signal (analysis signal) towards at least one of the two adjacent transducers in reception mode, such that, when at least one of the two adjacent transducers in reception mode receives the acoustic signal, the at least one of the two adjacent transducers produces an output signal at a first amplitude. As the acoustic signal is transmitted relatively well in the liquid layer (as opposed to the froth layer or the gaseous layer), the amplitude of such an output signal is relatively large.

Further, when the one transducer in generation mode transmits the acoustic signal towards the froth layer, the acoustic signal is damped by the froth layer such that the acoustic signal is not transmitted sufficiently so as to be detected by either of the two adjacent transducers in reception mode. Alternatively, it may be that the acoustic signal is transmitted, but transmitted so weakly, that when at least one of the two adjacent transducers in reception mode receives the acoustic signal, the acoustic signal, the acoustic signal produces an output signal in the receiving transducers at a given very low amplitude. It may be that such an output signal has an amplitude hundreds of times lower than the amplitude of the output signal in respect of transducers detecting transmissions through the liquid layer.

In an embodiment, the acoustic signal (analysis signal) from the one transducer in generation mode has a beam angle sufficiently wide such that, when the one transducer in generation mode transmits the acoustic signal towards the liquid layer, if the signal becomes attenuated by, for example, the bubbles in the liquid layer, the transmitter to signal is transmitted towards at least one of the two adjacent transducers in reception mode. This can occur due to the wide angled beam closing the path from the one transducer in generation mode to at least one of the two adjacent transducers in reception mode being substantially shortened through the liquid layer. In this regard, there is less likelihood of the parts of the beam transmitting at such wide angles to be attenuated in the liquid layer.

BRIEF DESCRIPTION OF THE DRAWINGS

For an understanding of the invention, and to show how it may be performed, optional embodiments thereof will now be described, by way of non-limiting examples only, and with references to the accompanying drawings, in which.

DETAILED DESCRIPTION OF OPTIONAL EMBODIMENTS OF THE INVENTION

Figure 1:
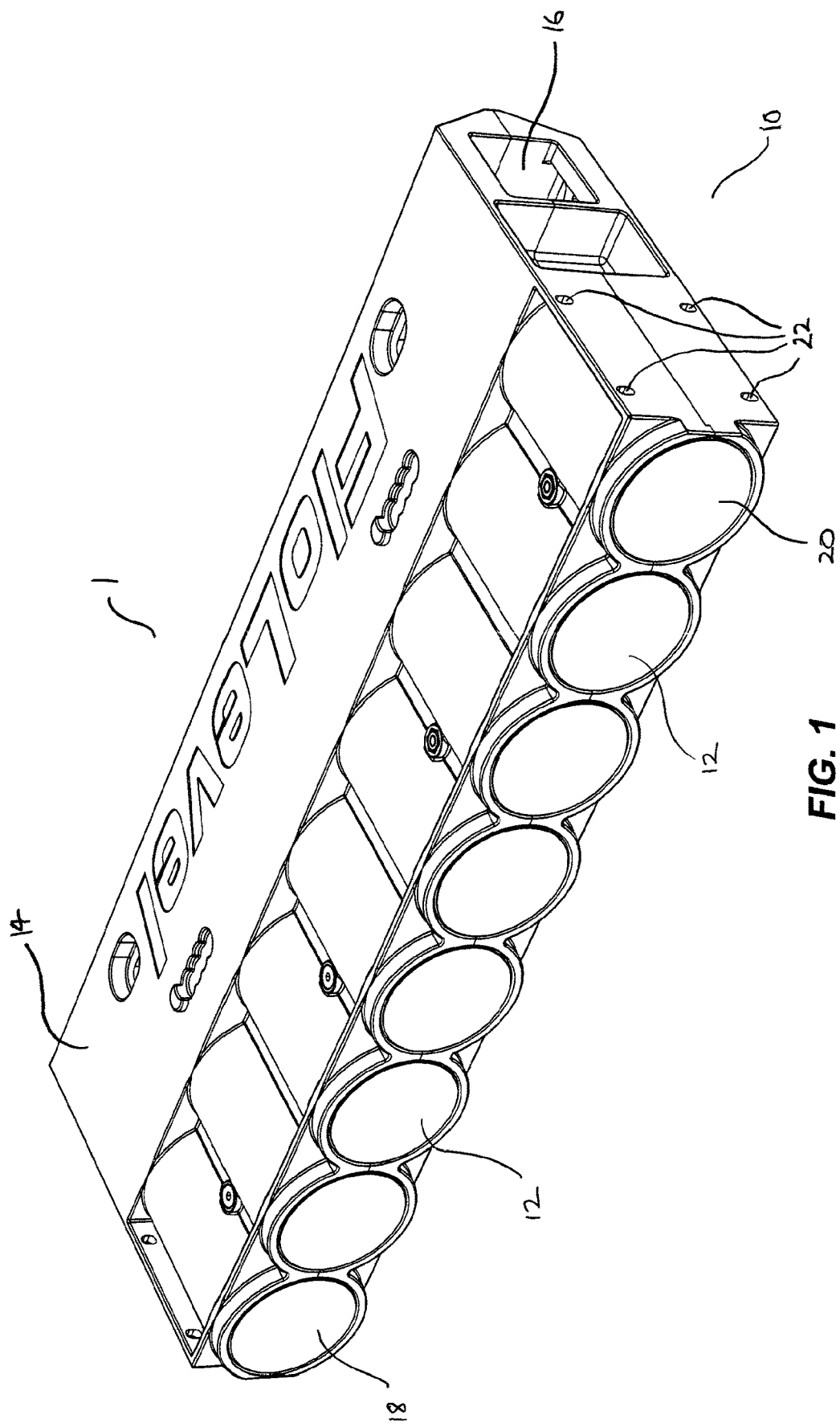
FIG. 1 is a perspective view of a single array.

The sensor/sensor system/sensing method 1 will be described with reference to the drawing in which, FIG. 1 shows a transducer array 10 including eight transducers 12, mounted in the transducer array housing 14 in a single line, and closely spaced (or abutting each other). The transducer array 10 may form an array component in an extended array 30 (see FIG. 5). It will be understood that, in embodiments, the transducer array 10 may include various electronic/electrical components such as a controller and/or a processor and/or a bus within the housing.

Figure 20:
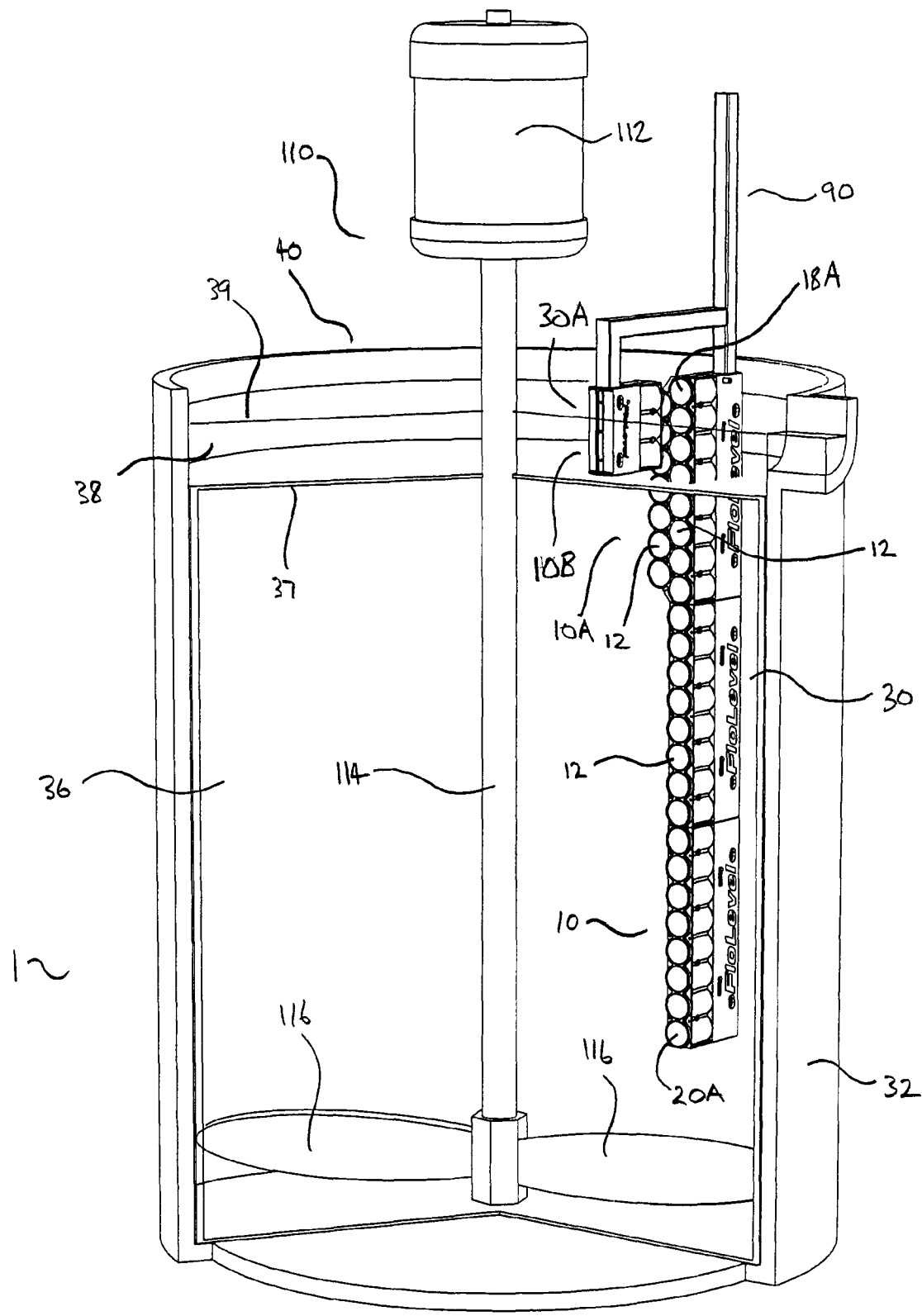
FIG. 20 is a partially cut-away perspective view of the sensor/sensor system in a flotation tank.

The array housing 14 also includes a tube or bore 16, which allows the array 10 to be mounted on a shaft or pole 54 of a support means (not shown in FIG. 1, but refer, for example, to FIG. 20).

Figure 5:
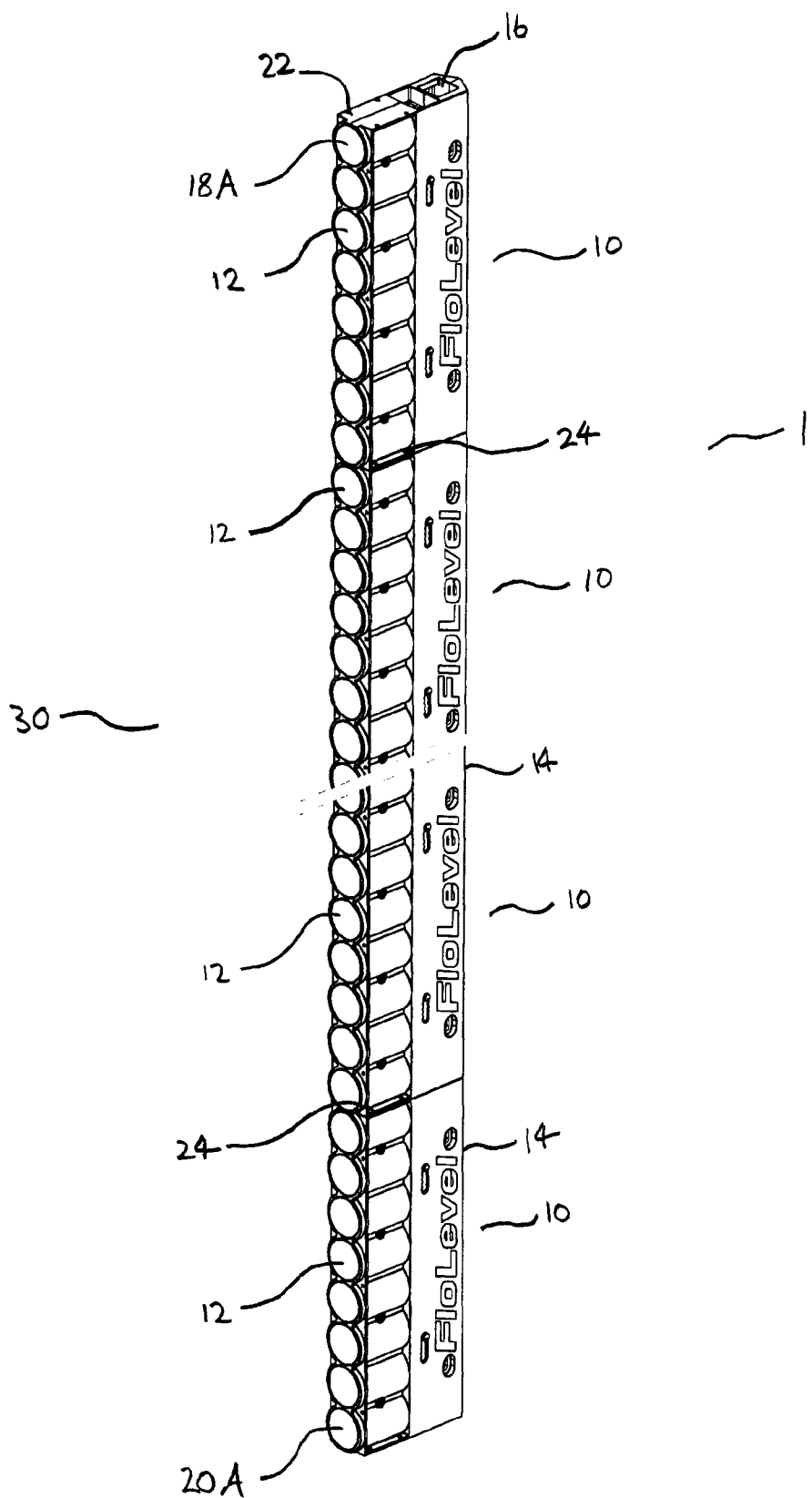
FIG. 5 is a perspective view of an extended array having a plurality of the at least one array of the sensor/sensor system/sensing method.

The transducer array 10 of the sensor/sensor system/sensing method 1 includes a top-most transducer 18 and a bottom-most transducer 20 (in the extended array, the top-most transducer is denoted as 18A, and the bottom-most transducer is denoted as 20A, see FIG. 5). It will be understood that the terms top-most and bottom-most correspond with the more general terms proximal-most and distal-most, or vice versa.

The transducer array housing 14 also includes bolt holes 22, which may be employed when connecting the transducer housing (as an array component) to another like array component, so as to form an extended array. The connection using connecting bolts 24 (not shown in FIG. 1, see, for example, FIG. 5).

Figure 2:
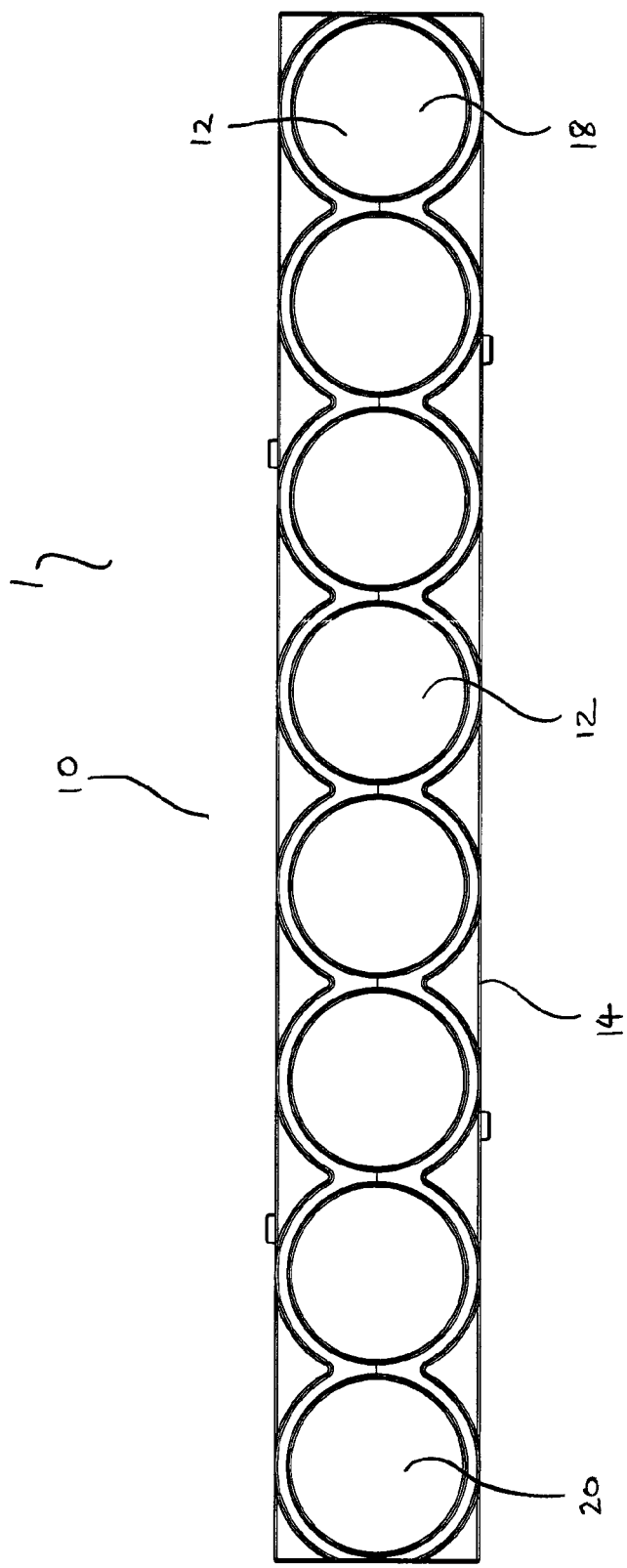
FIG. 2 is a front elevation view of the array shown in FIG. 1.
Figure 3:
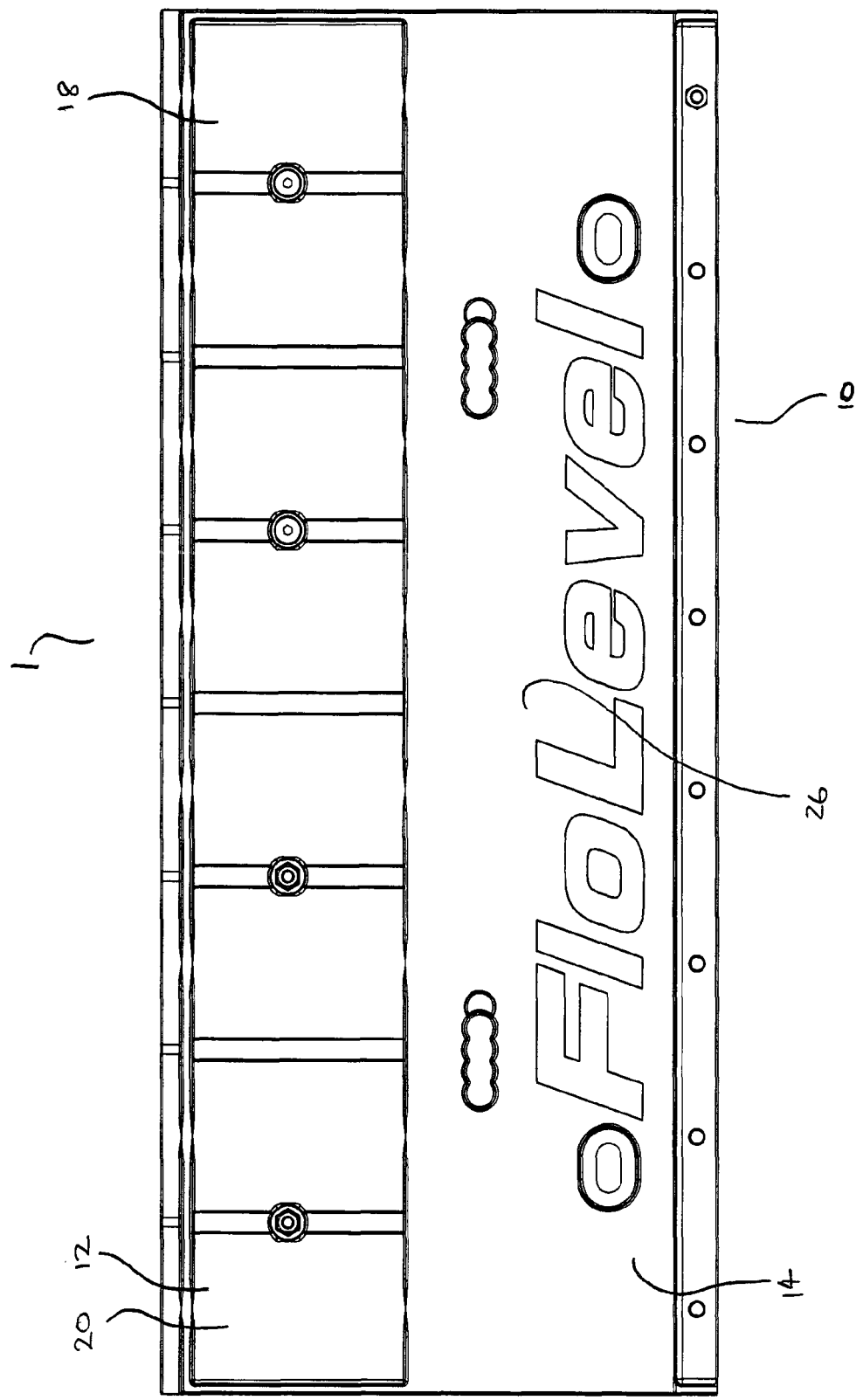
FIG. 3 is a side elevation view of the array shown in FIGS. 1 and 2.
Figure 4:
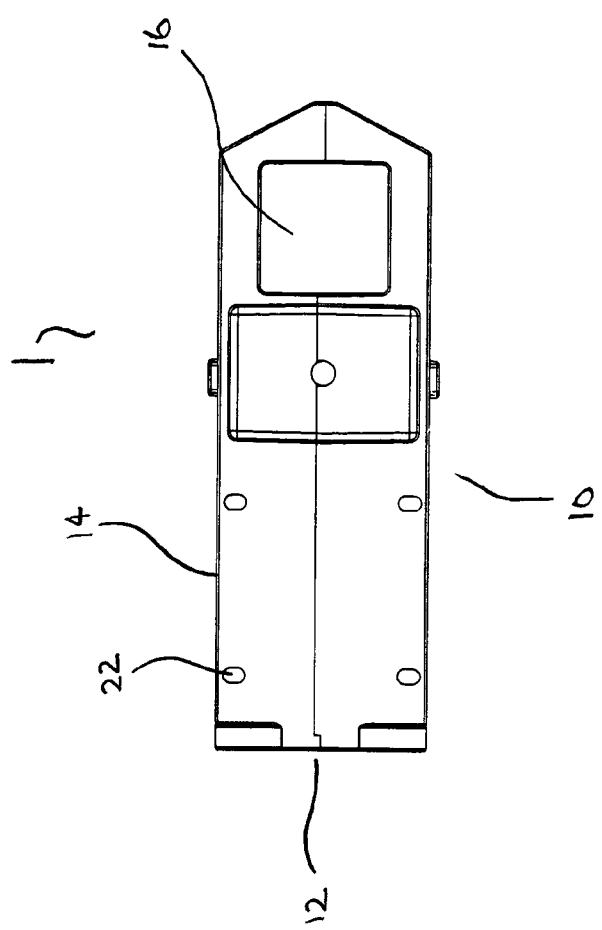
FIG. 4 is a top plan view of the array shown in FIGS. 1 to 3.

In FIGS. 2 and/or 3, it can be seen that the transducers 12 are mounted close to, or abutting each other. FIG. 3 also shows an area for a PCB (printed circuit board) 26, along with other electronic componentry for the sensor/sensor system/sensing, method.

FIG. 5 shows an embodiment wherein a number of transducer arrays 10 form transducer array components, and are connected together so as to form an extended array 30. The extended array has a top-most transducer 18A, along with a bottom-most transducer 20A. The array components 10 are connected together via bolt holes 22 and connecting bolts 24. However, it will be understood that there may be other means of connecting the array components 10 together so as to form the extended array 30. A bus (not shown) may data connect the array components together, so that data is transmitted between the arrays, the transducers of the arrays, the controller and the processor. There may be multiple processors and controllers for the sensor/sensor system/sensing method 1, with a master controller and processor. However, an efficient design may include only one controller and one processor for the sensor/sensor system/sensing method.

Figure 6:
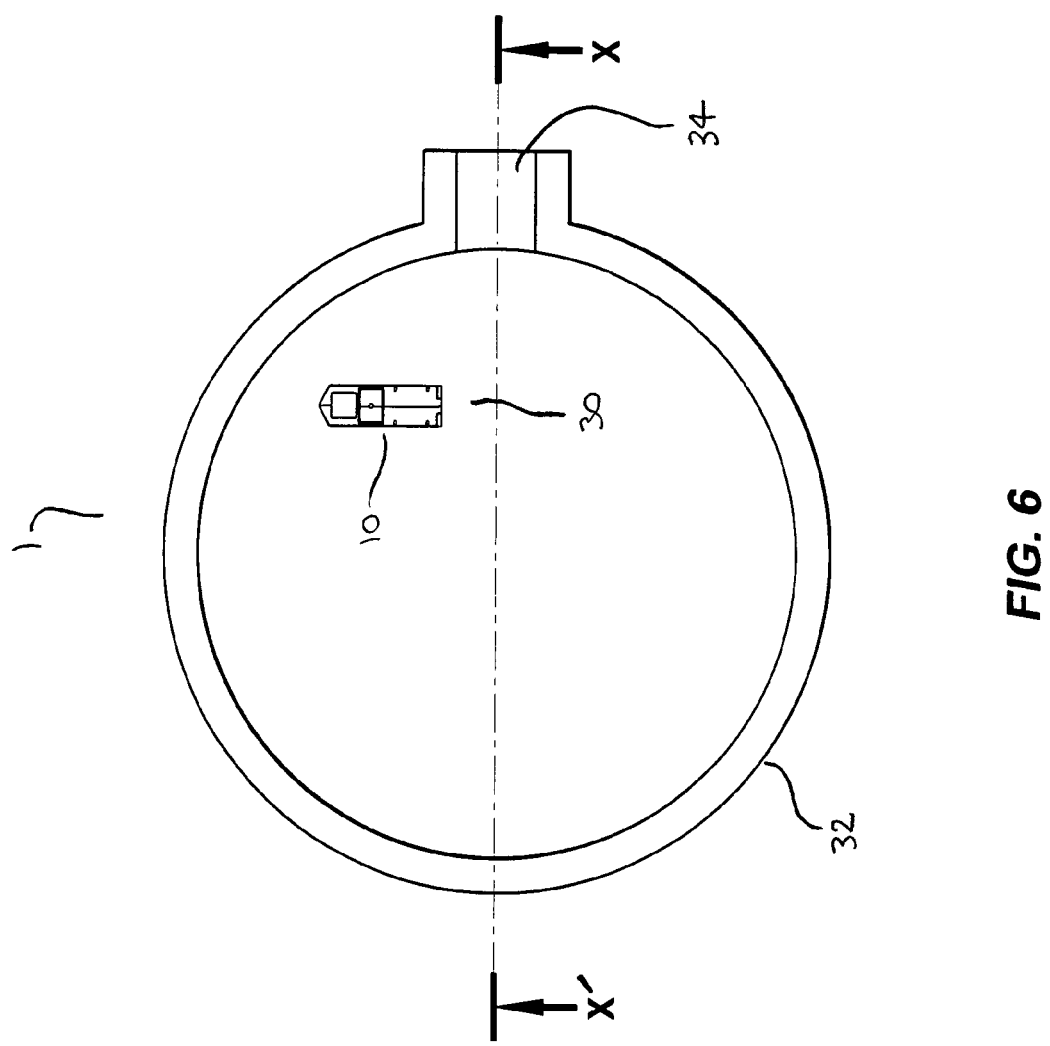
FIG. 6 is a top plan view of an extended array, in situ, in a flotation tank.

FIG. 6 shows a top plan view of an extended array 30, in situ, in a flotation cell/flotation tank 32 forming a sensing system. The flotation cell/flotation tank has a launder (or spout) 34, which is adapted to carry froth spill over.

Figure 7:
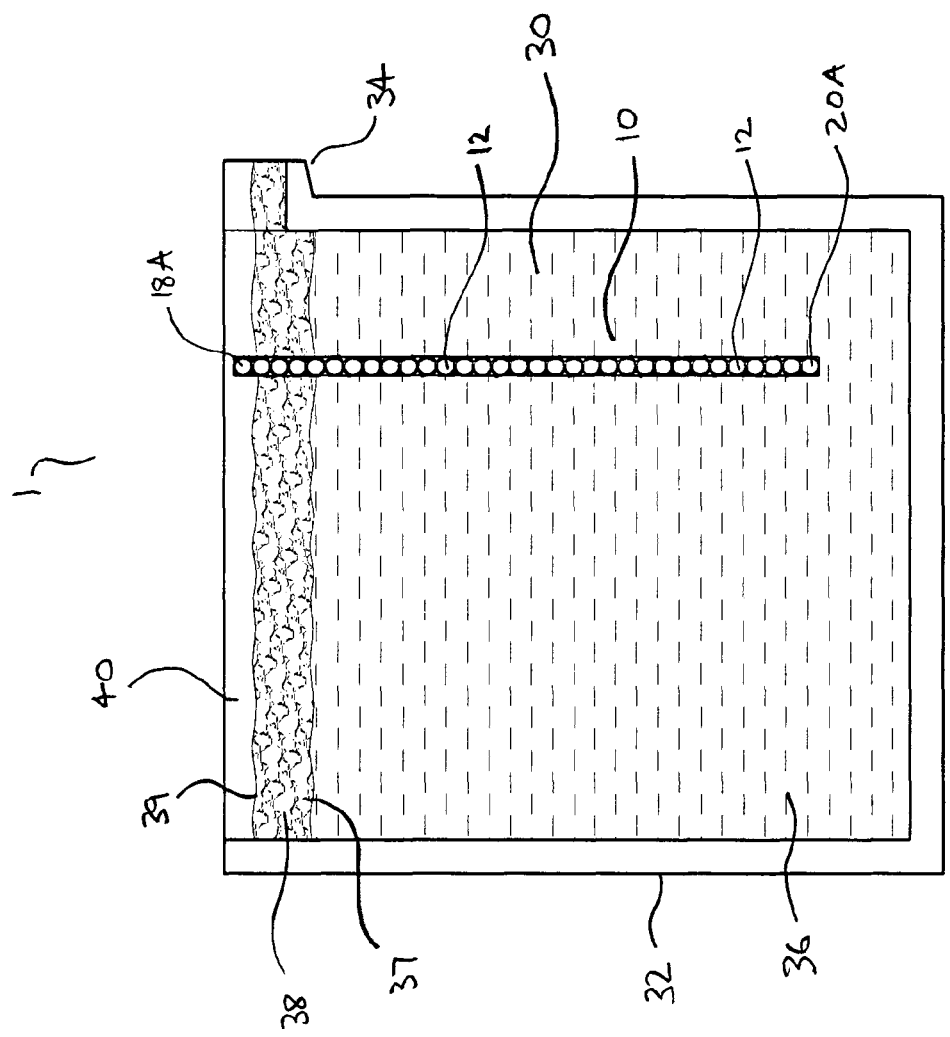
FIG. 7 is a side, cross-sectional view across line X-X' in FIG. 6, showing the flotation tank with the extended array, in situ.

FIG. 7 is a cross-sectional view across line X-X', from FIG. 6. In FIG. 7, the extended array 30 can be more-clearly seen, with the top-most transducer 18A in a position such that it is above the top level of the froth layer 38. As such, the top-most transducer 18A of the extended array 30 is in the gaseous (air) layer 40. It can also be seen in FIG. 7 that most of the extended array 30 is placed in the liquid (slurry/pulp) layer 36.

FIG. 7 shows a flotation cell/flotation tank wherein the liquid layer 36, the froth layer 38 and the air layer 40 have interfaces therebetween. In this regard, there is a liquid layer/froth layer interface 37 and froth layer/air layer interface 39.

It will be understood that FIG. 7 shows the layers 36, 38 and 40 as being in a proper operating condition, with the liquid layer/froth layer interface 37 below the launder 34, such that the liquid will not spill over the launder; the froth layer/air layer interface 39 being below the top-most transducer 18A, such that the froth is able to spill over the launder 34, but the froth does not overflow out of the flotation cell/flotation tank 32.

Figure 8:
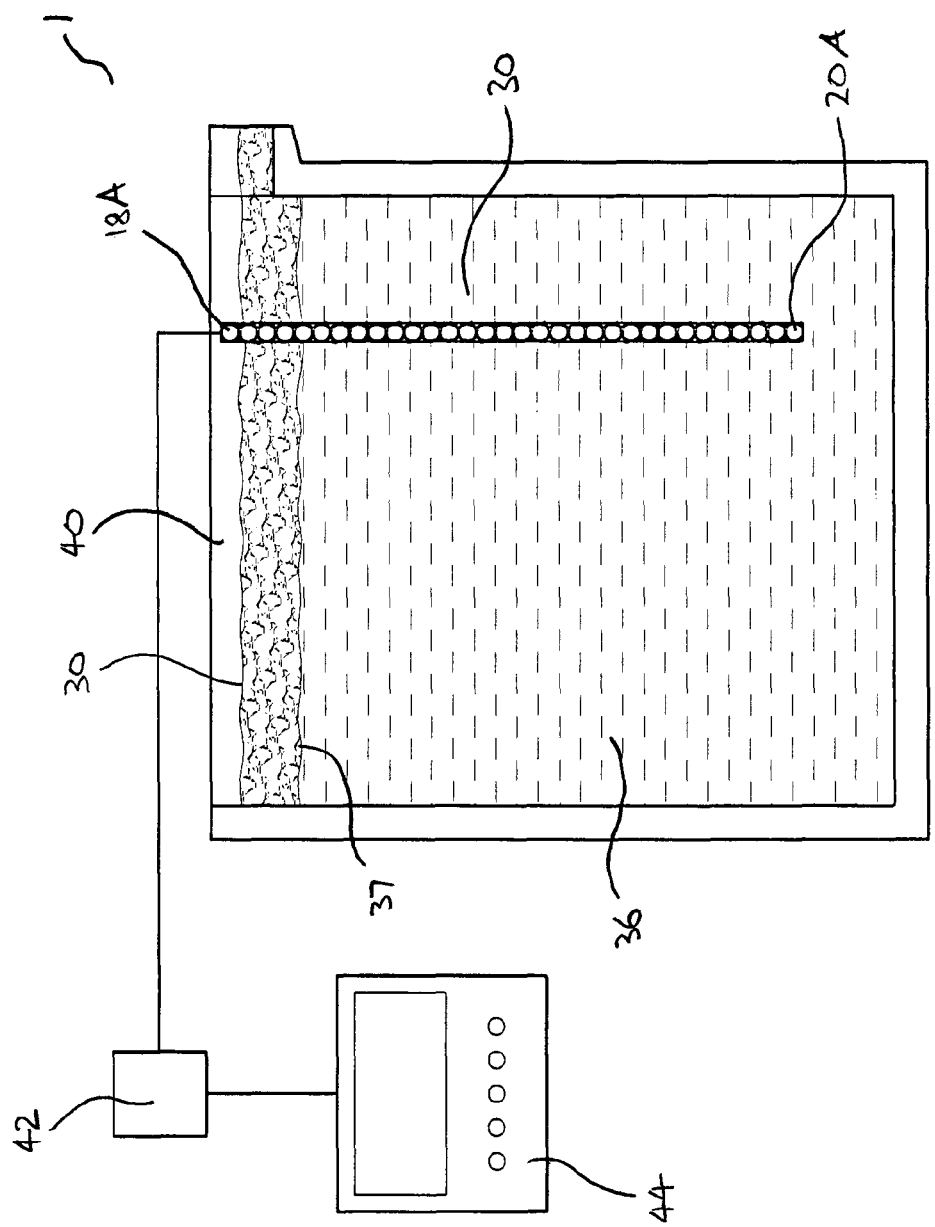
FIG. 8 is a similar view to FIG. 7, additionally showing control and monitoring equipment for the sensor.

FIG. 8 is similar to FIG. 7 and showing a controller 42 for controlling the operation of the extended array 30. FIG. 8 also shows monitoring apparatus 44 (which, in embodiments, may also include the processor for processing signals from the transducer array). The monitor may show various data about the operation of the flotation cell/flotation tank including the heights of the interfaces 37, 39, and other selected information. It will be understood that the monitor may be geographically proximal to the flotation tank, or remote, say, in another country.

Figure 9:
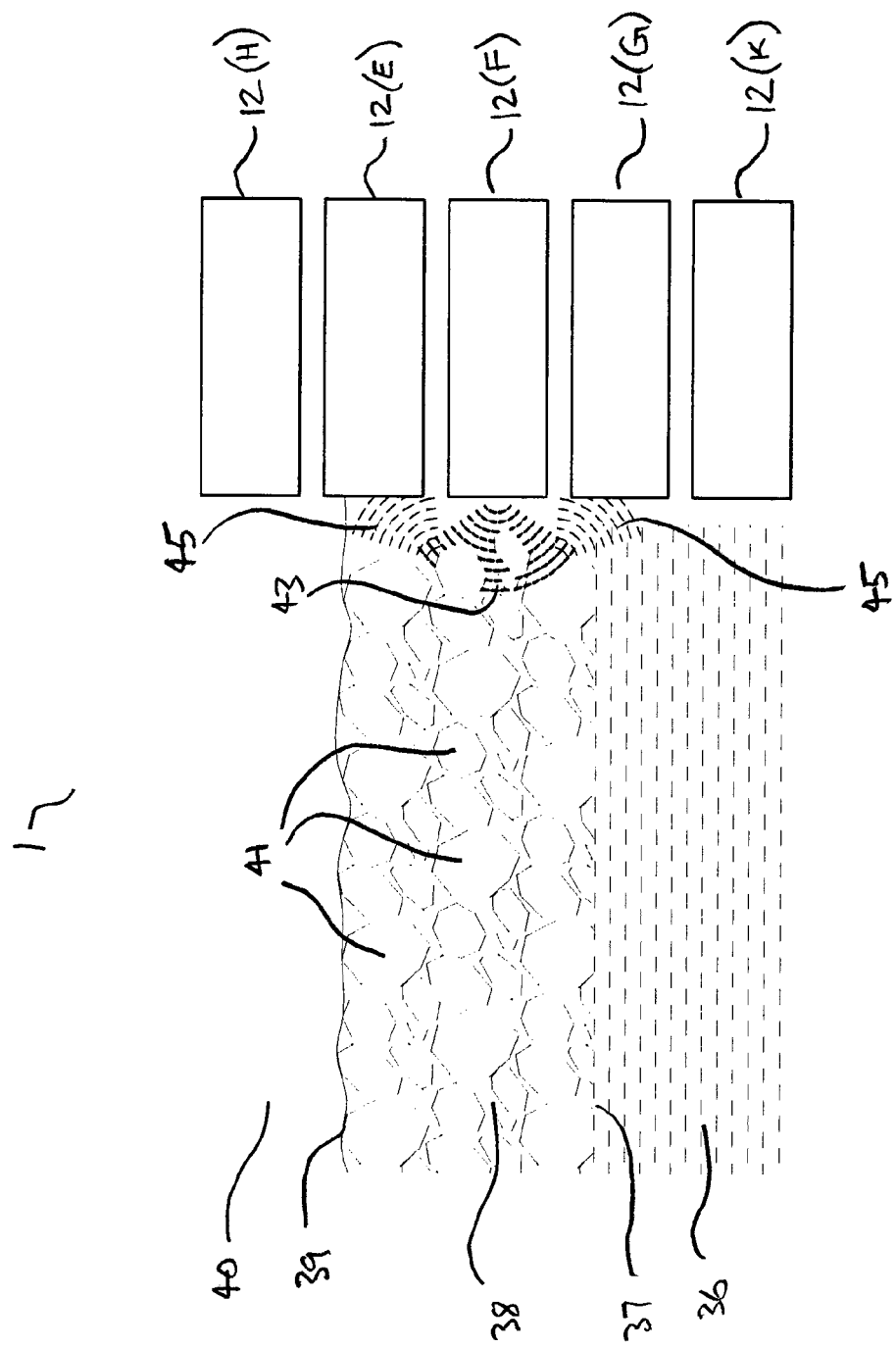
FIG. 9 is a side cross-sectional view showing a detail of the sensor (including five shown transducers), with one transducer in generation mode, transmitting into the froth layer.

FIG. 9 shows details of a pulsing operation or a scan step, where the centre-most transducer 12 (F) is in generation mode and generating an acoustic signal which is moving towards the froth 38 in the froth layer. The acoustic signal (analysis signal) 43 is attenuated by bubbles 41 in the froth 38. However, in this particular embodiment, a very weak reflected signal 45 is transmitted to the transducers 12 in reception mode, immediately adjacent the transducer 12 in generation mode. It will be understood that in some circumstances, and for different types of froth, the analysis signal will be effectively completely attenuated so that adjacent transducers (12 (E) and 12 (G)) will not receive any analysis signal. For better clarity, the transducer in generation mode is denoted as 12 (F), the higher adjacent transducer in reception mode is denoted as 12(E), and the lower immediately adjacent transducer in reception mode is denoted as 12(G). It will be appreciated that this is only one possible scan configuration, and other scan configurations are contemplated within the scope of the present invention.

During another scan step, when transducer 12 (H) in FIG. 9 is in generation mode and attempts to transmit an analysis signal, because the transducer 12 (H) is located in air, the transducer will produce a ring-down signal, which is a characteristic for a signal from a transducer in generation mode located in air. The ring-down signal will be received by the processor, which then determines that transducer 12 (H) is in the air layer.

When transducer 12 (K) is in generation mode and transmits an analysis signal into the liquid layer, the signal will transmit very readily through the liquid medium, thus causing adjacent transducers (transducer 12 (G) being a higher adjacent transducer) in reception mode during that scan step to receive an analysis signal with a high amplitude. The high amplitude signal is provided to the processor, which can then determine that transducer 12 (G), along with the lower adjacent transducer to transducer 12 (K), are in the liquid layer.

The height of each of the transducers relative to the flotation tank is known, so it is possible to calculate the height of the liquid, the froth (or equivalently the liquid/froth interface and the froth/air interface) in the tank.

Figure 10:
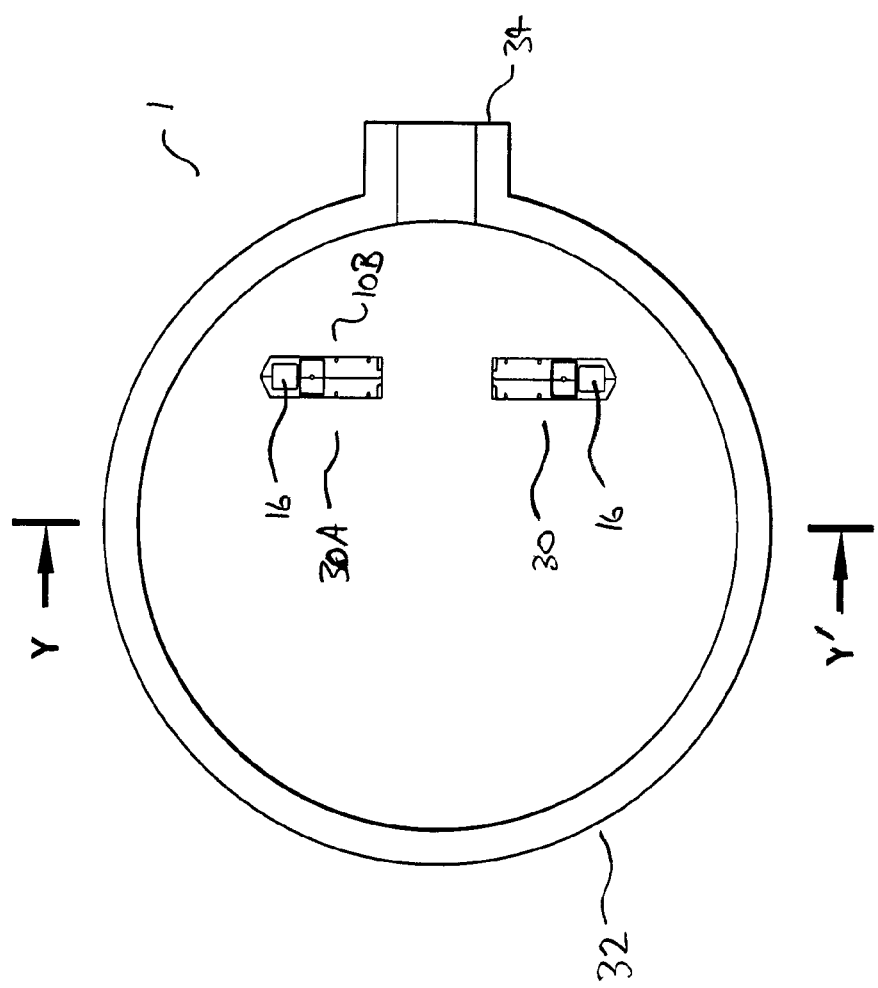
FIG. 10 is a top plan view showing the sensor, in si/ti in the flotation tank, the sensor including a primary array and a secondary array, the secondary array placed in the flotation tank so as to be oppositely facing the primary array.

FIG. 10 shows an alternative embodiment of the sensor/sensor system/sensor method 1, where a secondary transducer array 30A (having a single array 10B) is placed in the flotation cell/flotation tank 32, such that the top-most transducer in the secondary array is oppositely facing the top-most transducer 18A in the primary array 30. In such an embodiment, the transducers of the secondary array 30A and the top-most transducers of the primary array 30 are able to operate together so as to provide information about froth, including height. The information may also include density and froth movement.

Figure 11:
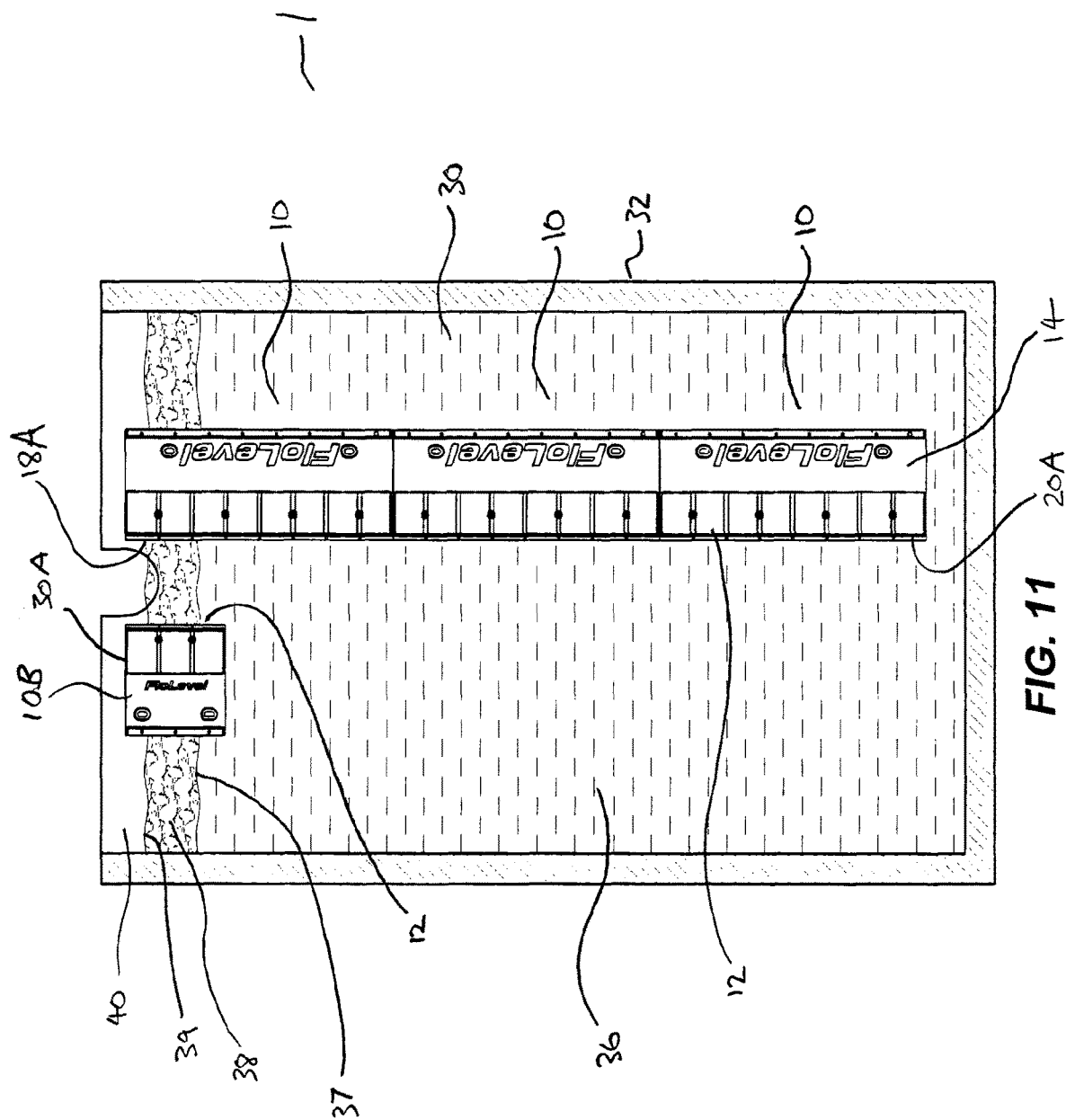
FIG. 11 is a side cross-sectional view across line Y-Y' in FIG. 10.
Figure 12:
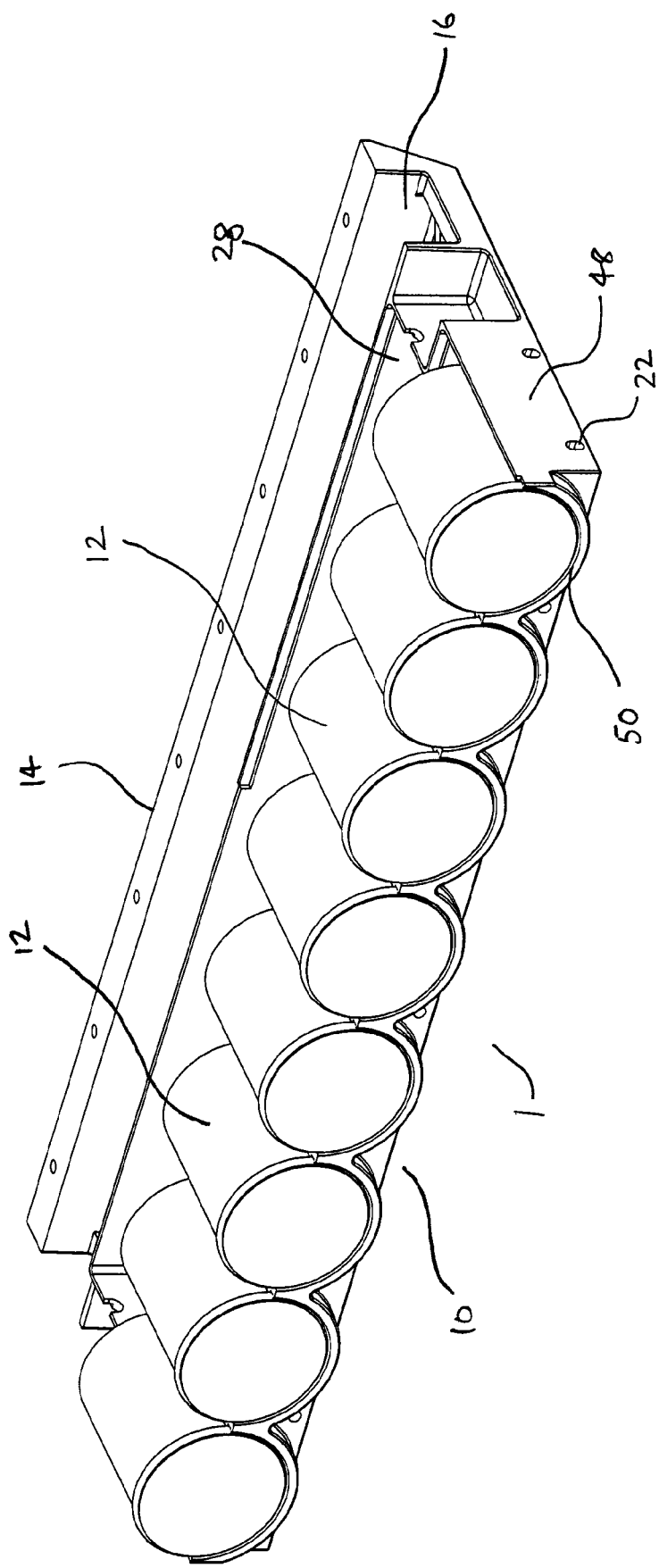
FIG. 12 is a perspective view of an array without part of the array housing.
Figure 13:
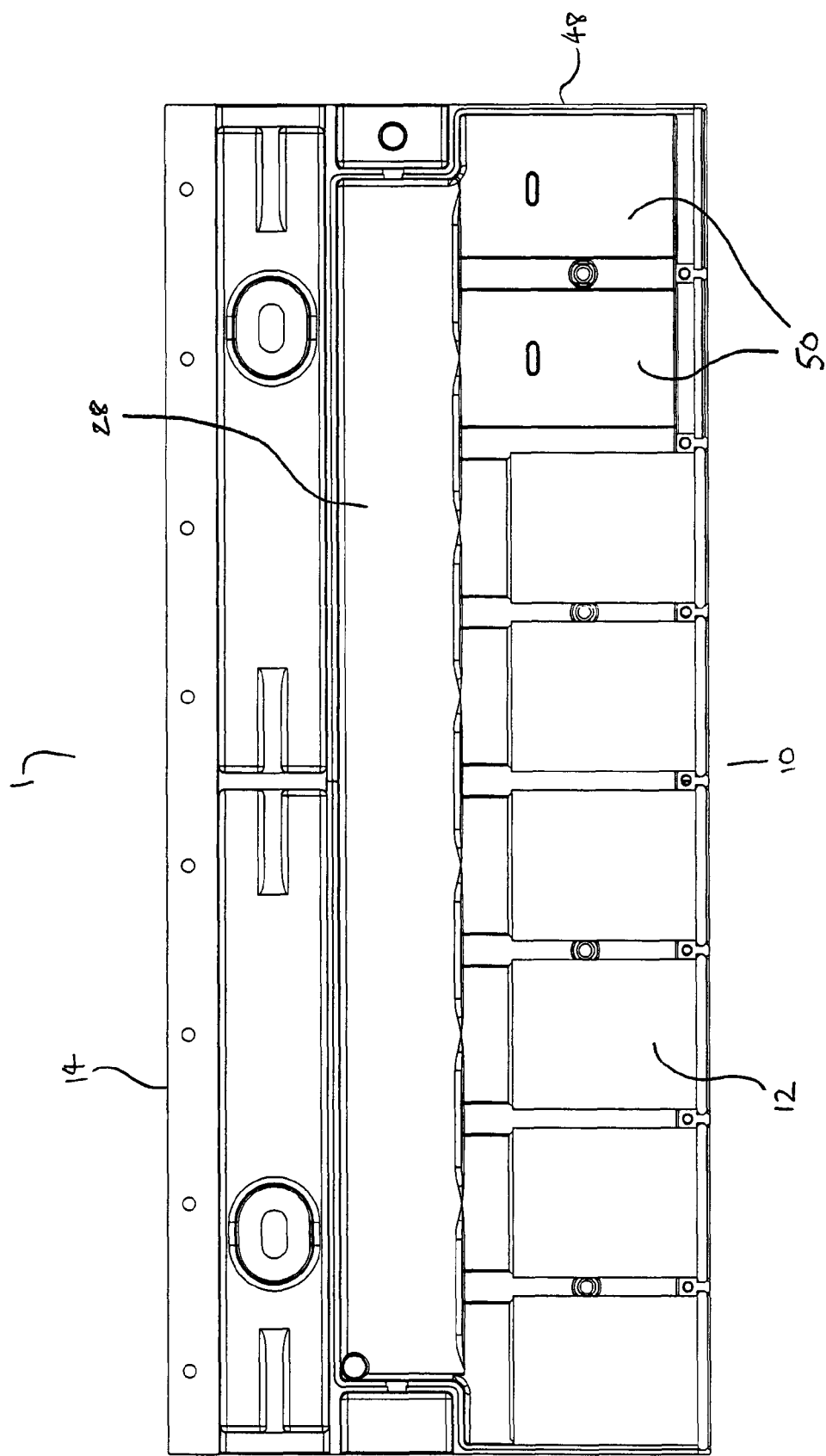
FIG. 13 is a side cross-sectional view of the array shown in FIG. 12, with two of the transducers of the array not shown.
Figure 14:
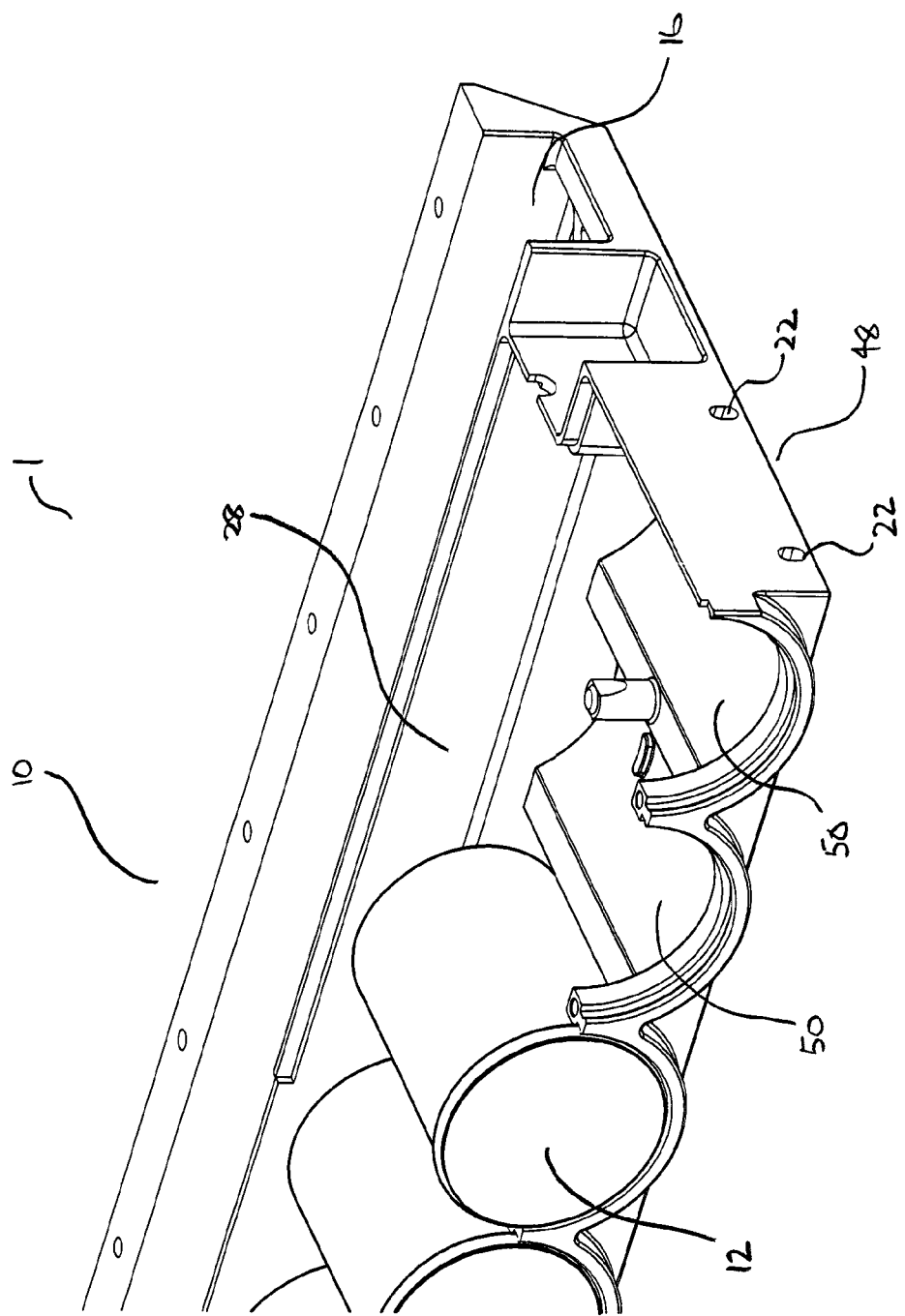
FIG. 14 is a partial perspective view of the array as shown in FIG. 13.
Figure 15:
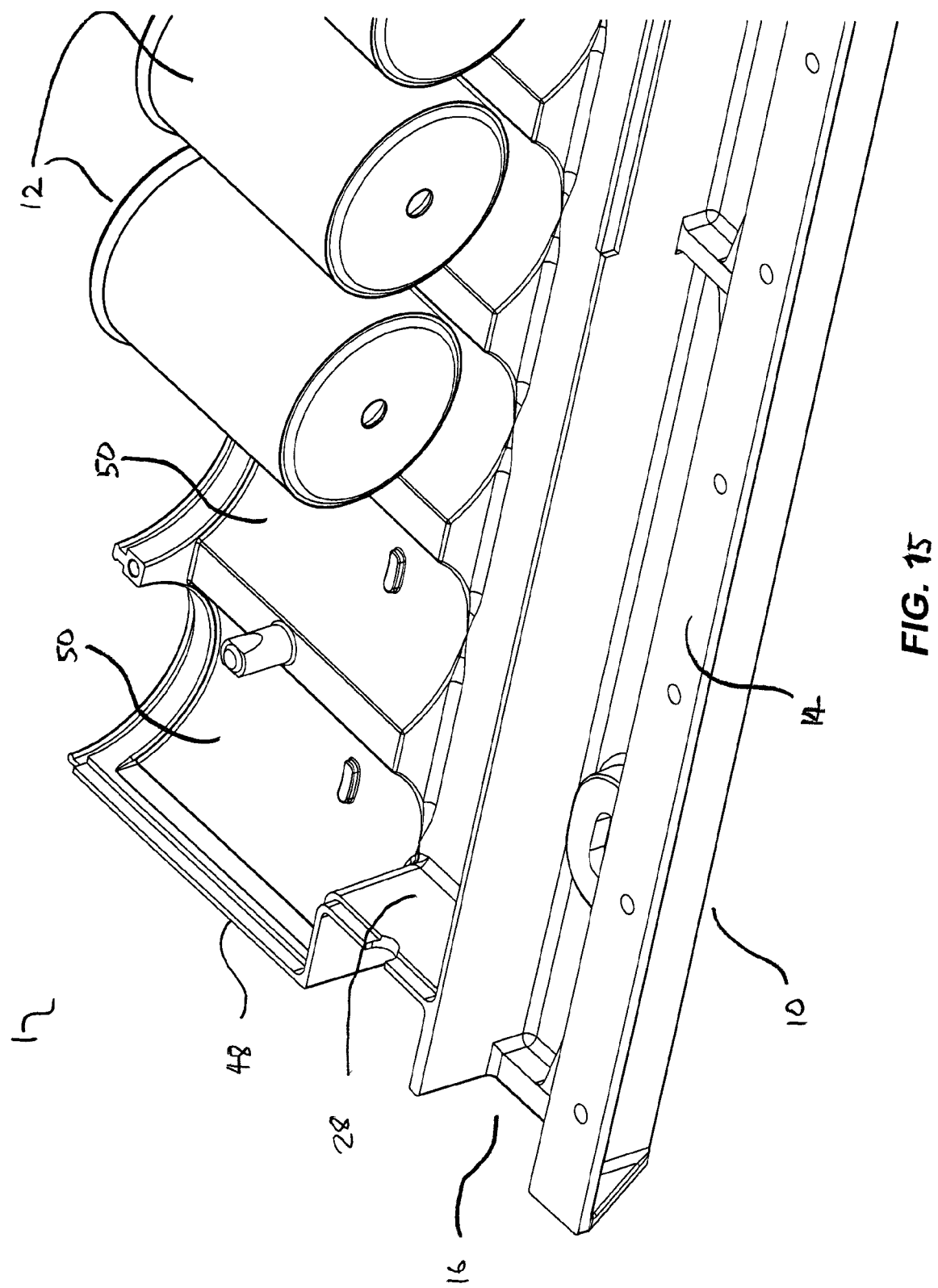
FIG. 15 is a reverse perspective view of FIG. 14.
Figure 16:
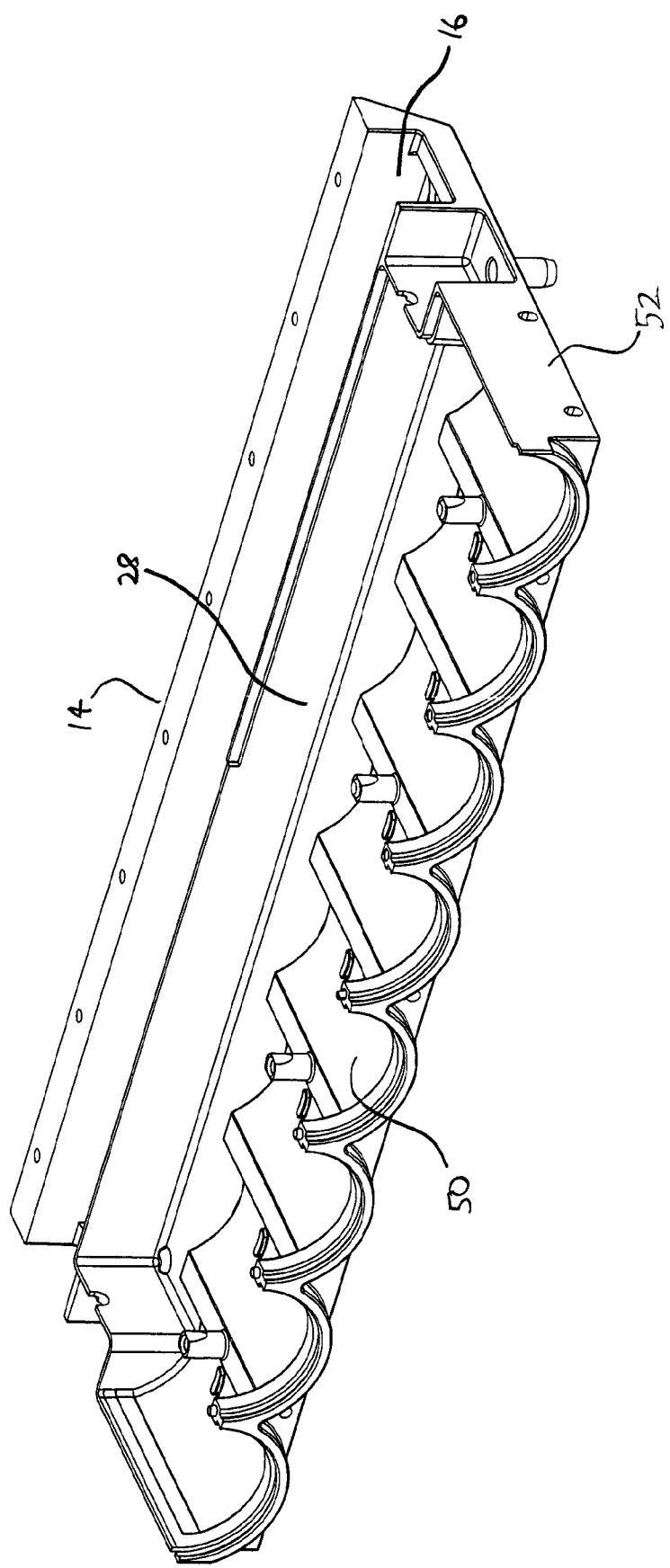
FIG. 16 is a perspective view of a first segment of an array housing.
Figure 17:
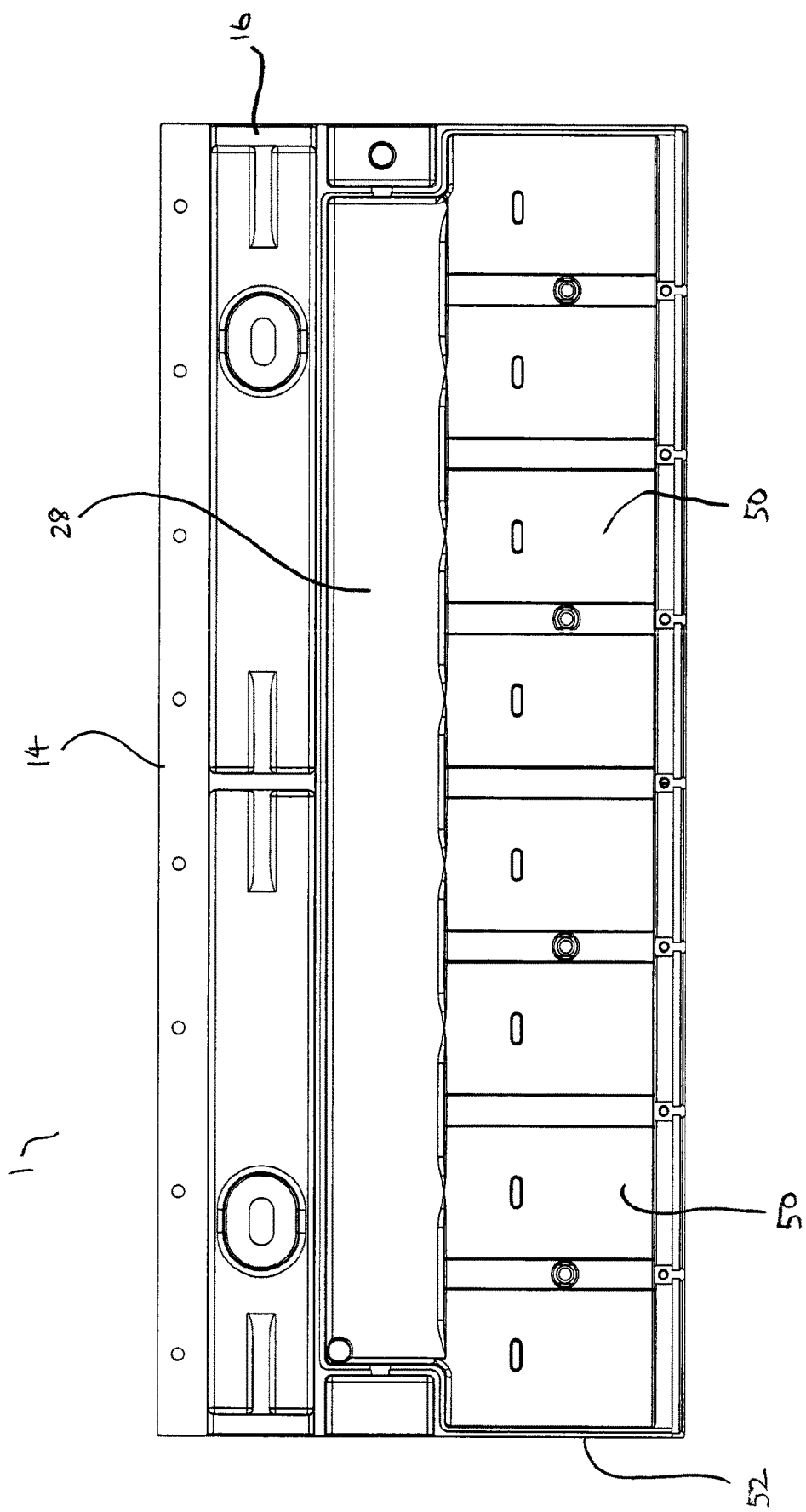
FIG. 17 is a top plan view of the array shown in FIG. 16.
Figure 18:
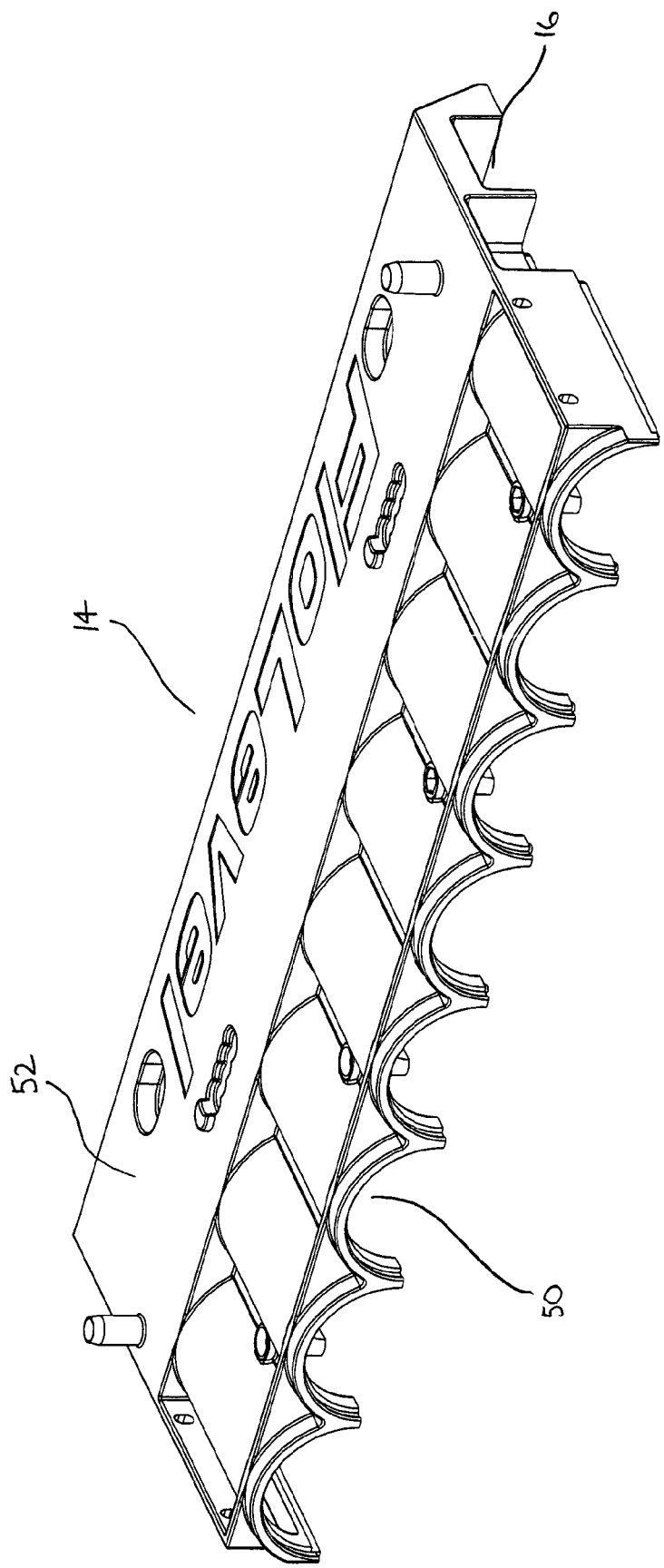
FIG. 18 is a top perspective view of a second segment of an array housing.

FIG. 11 shows a side cross-sectional view across line Y-Y' from FIG. 10. FIG. 11 shows, perhaps more-clearly, the position of the secondary array 30A (having a single array 10B with three transducers 12), where it is oppositely facing the top-most transducers in the primary array 30. The top-most transducer of the secondary array is located partially in the air layer 40 and partially in the froth layer 38, so as to intersect the air/froth interface 39; the middle transducer of the secondary array is located entirely in the froth layer; and, the lower-most transducer of the secondary arrays is located partly in the froth layer and partly in the liquid layer 36, so as to intersect the froth/liquid interface 37. The top three (3) transducers 12 of the primary array 30 are similarly positioned in the flotation tank 32.

FIGS. 12, 13, 14, 15, 16, 17, and 18 show an embodiment of the transducer array 10 of the sensor/sensor system/sensing method. These figures show how the housing 14 may be formed from two housing segments, including a first housing segment 48 and a second housing segment 52. Also depicted are channels 50 in the first and second housing segments 48, 52, the channels 50 are for seating the transducers 12. In FIGS. 12 to 18, the tube or bore 16 in the housing 14 has a substantially square cross-section shape.

Figure 19:
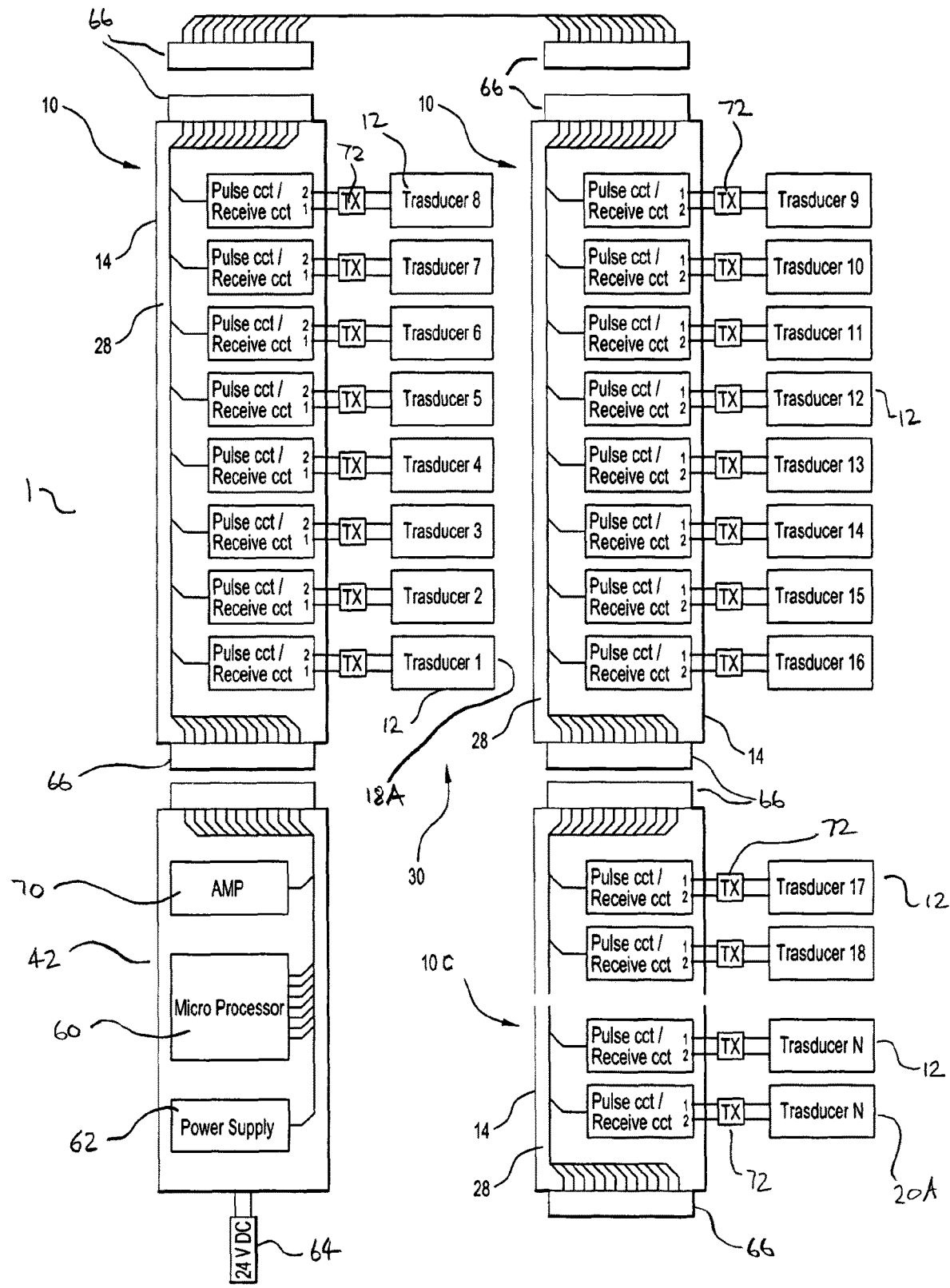
FIG. 19 is a schematic of electrical/electronic componentry and configuration in an extended array.

FIG. 19 is a schematic of electrical and electronic components in a sensor/sensor system/sensing method 1. The sensor 1 includes a number of arrays 10, with one array 10C being a shorter array, having only four (4) transducers. The sensor 1 includes a microprocessor 60, being the processor for the sensor, and a power supply 62 running from a 24V DC input 64 and an amplifier 70. The arrays 10/10C are connected via electrical/data connectors 66, which may be ribbon type connectors or any other type of connector suitable for the circumstances of mining, which can be very harsh physical environments. Each transducer 12 in an array 10/10C has a pulse circuit/receive circuit 68, which allows the transducer to be, respectively in generation mode/reception mode. Between each pulse circuit/receive circuit and its respective transducer is a transmitter 72.

FIG. 20 shows an embodiment where the at least one array includes a primary extended array 30, having a number of arrays 10, and a secondary array 10B, opposite the primary array, and located opposite a top end of the primary array. The arrays are mounted on a support 90, configured for this arrangement of arrays 30/30A/10/10A/10B. The top-most array 10A in the extended primary array 30 has two lines of transducers 12, parallel and offset (explained in more detail in FIGS. 21 and 22). The sensor/sensor system/sensing method 1 is in a flotation tank 32, which is shown having three layers of substances, and which could be a liquid layer 36 a froth layer 38 and an air layer 40.

The tank 32 has an aerator 110, including a motor 112 a shaft 114 and blades 116. In embodiments, the aerator can be controlled by the sensor processor so as to set the speed of rotation, and thus the amount of aeration. This can control the amount of froth production. In some other types of flotation tank, the aeration is provided by aeration tubes which pump air into the liquid. These aeration tubes can also be controlled by the processor to regulate aeration in the tank.

Figure 21:
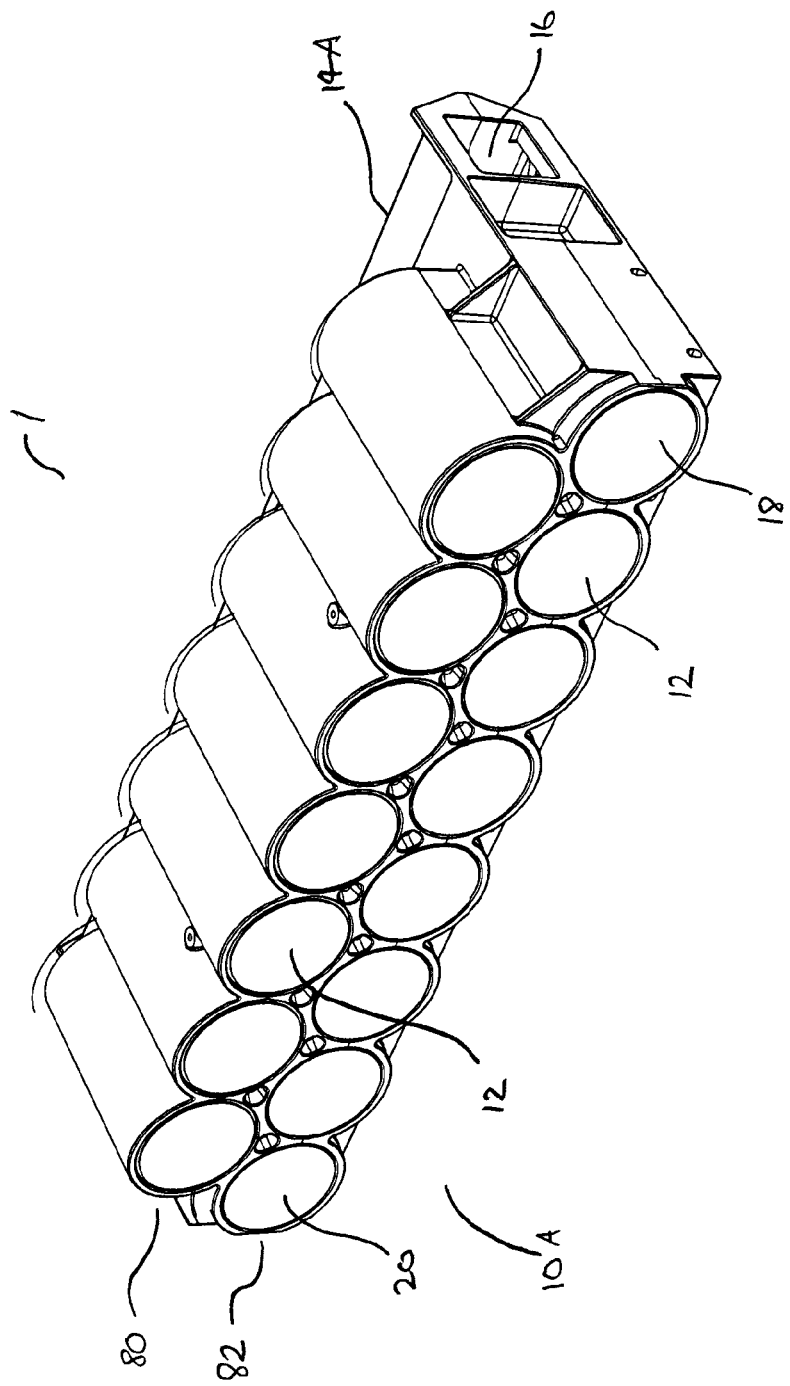
FIG. 21 is a perspective view of an alternative embodiment of an array having two parallel lines of transducers, wherein transducers in one line are offset from transducers in the other line.

FIG. 21 is an embodiment of the at least one array 10C, having two parallel lines of transducers 12, wherein transducer in one line are offset from transducers in the other line in an appropriately configured housing 14A. The first line of transducers 80 (the top-most shown in FIG. 21) are offset from the second line of transducers 82 (the bottom-most shown in FIG. 21), by a about half width (or about the radius) of the transducers 12 (allowing for extra offset due to the housing surrounding each transducer). The arrangement of the transducers in the lines 80, 82 is somewhat of a "honeycomb" pattern, in that transducers of one line 80 are situated in the space between transducers of the other line 82.

One possible advantage of such an arrangement of parallel offset transducers in an array 10A is that it is possible to achieve a more accurate/precise determination of the height of a layer in a flotation tank, or the height of an interface between layers. This accuracy/precision can be further improved by having an arrangement with four (4) rows of transducers, each row of transducers offset by about a quarter width of a transducer from an adjacent row of transducers. Of course, there are practical limitations to the amount of accuracy/precision that can be achieved with such arrangements, as the spacing between transducers in a first row and a fourth row of four rows will have an effect.

Figure 22:
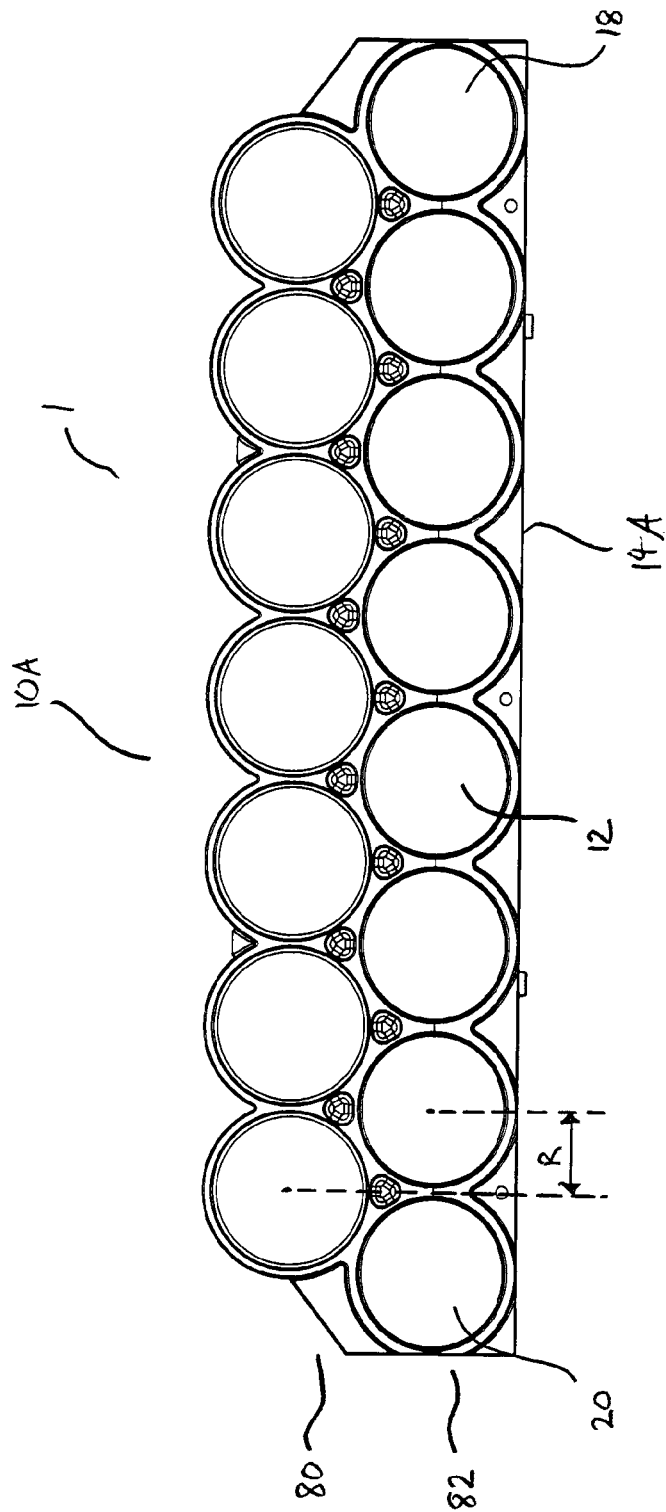
FIG. 22 is a front elevation view of the array shown in FIG. 21.

FIG. 22 shows the array 10A of FIG. 21 as a front elevation view, where it is easier to see the arrangement of the rows of transducers 80, 82. The offset is shown as R, which is a little larger than the radius of a transducer, or the exposed face of a transducer out of the housing 14A.

Figure 23:
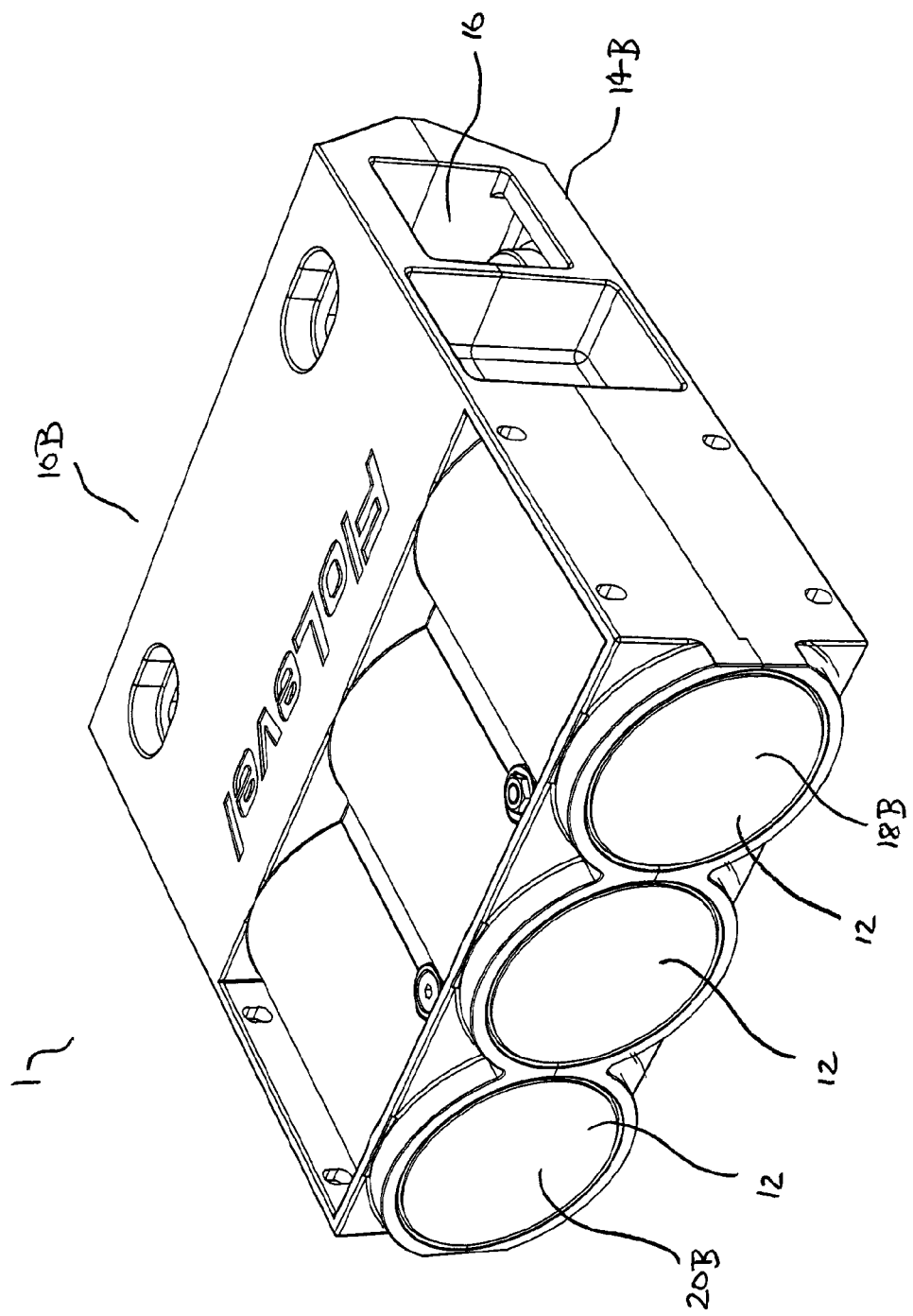
FIG. 23 is a perspective view of another alternative embodiment of an array having three (3) transducers in a linear configuration.

The embodiment of the array 10B shown in FIG. 23 is useful for a secondary array 30A as shown in previous figures. The array has a top-most transducer 18B and a bottom-most transducer 20B, when arranged vertically, say, in a flotation tank. The transducers 12 are arranged in a housing 14B.

Figure 24:
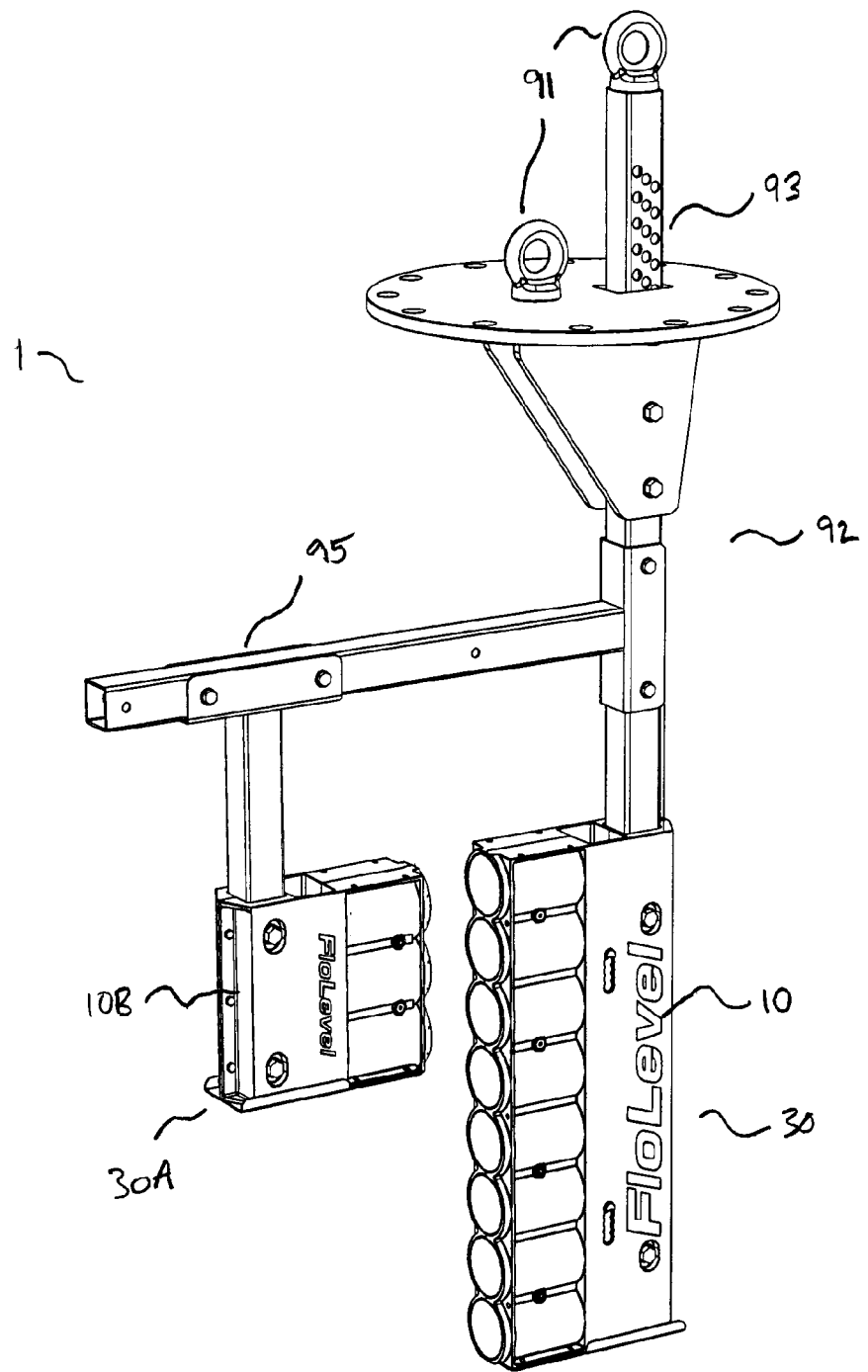
FIG. 24 is a perspective view of one arrangement of the at least one array, including a primary array and a secondary array, both mounted on a support.
Figure 25:
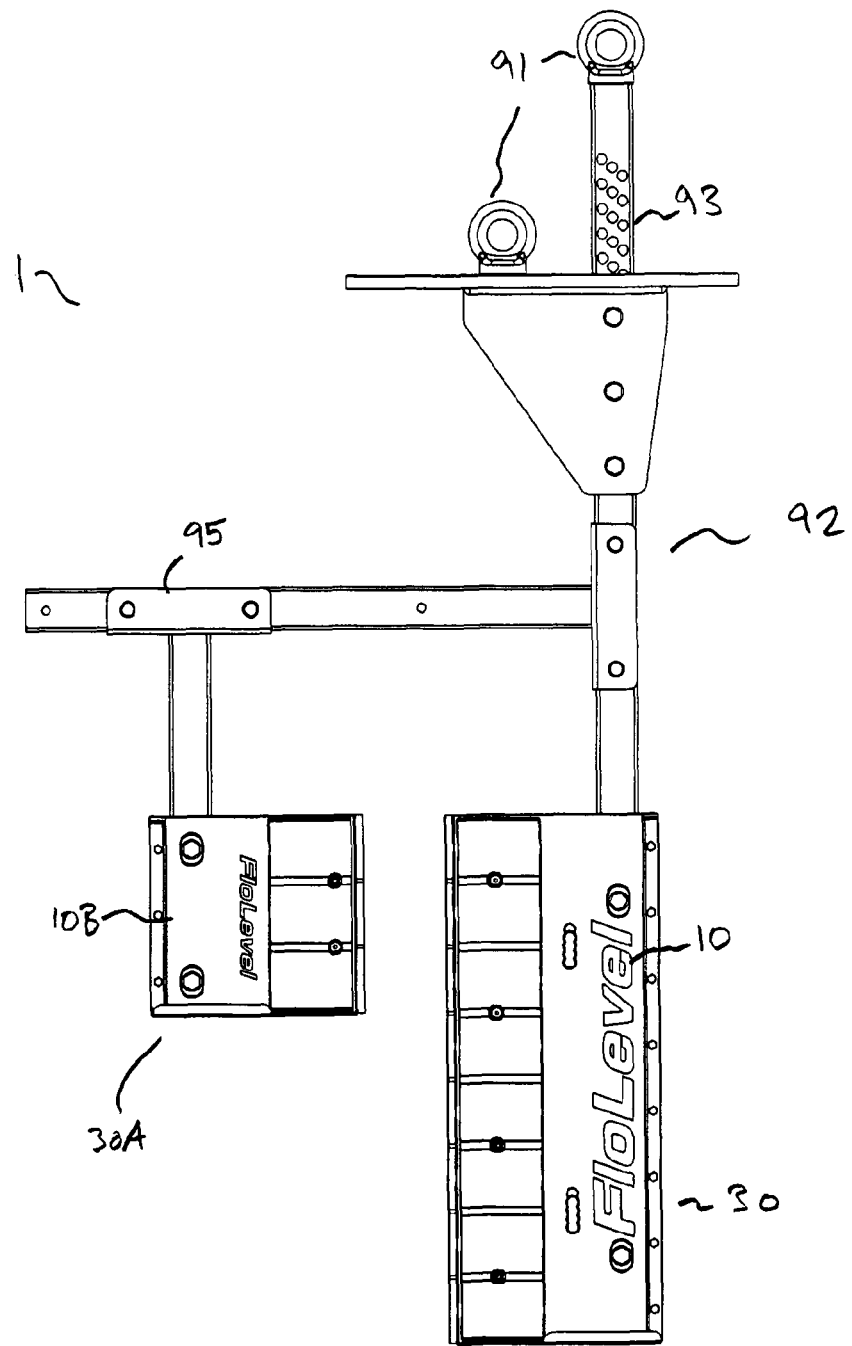
FIG. 25 is a side elevation view of the arrangement shown in FIG. 24.

FIGS. 24 and 25 show an arrangement of the at least one array having a primary array 30 consisting of a single array 10, and a secondary array 30A consisting of a single array 10B, being shorter than the primary array. The arrays are mounted on a support 92, having eyelets 91 for suspending the support from cables, and a pin and hole arrangement 93 (pin not shown) for adjusting the height. The support 92 also has a horizontally adjustable mount 95 for the secondary array 30A.

Figure 26:
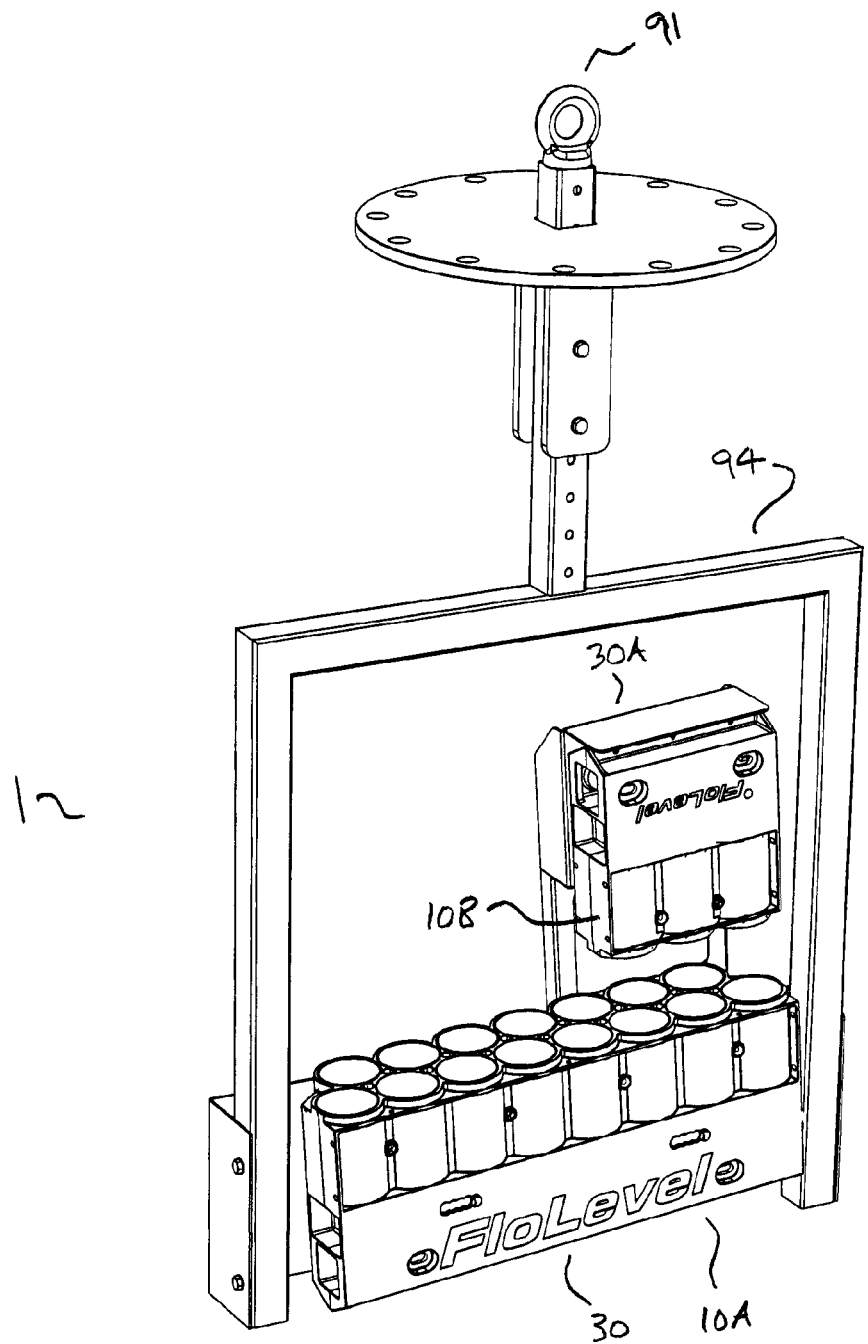
FIG. 26 is a perspective view of another arrangement of the at least one array, including a primary array having two lines of parallel transducers (as shown in FIGS. 21 and 22), and a secondary array (as shown in FIG. 23), the arrays mounted on a support which allows the arrangement to be selectively fixedly or moveably tilted at an angle from a horizontal position.
Figure 27:
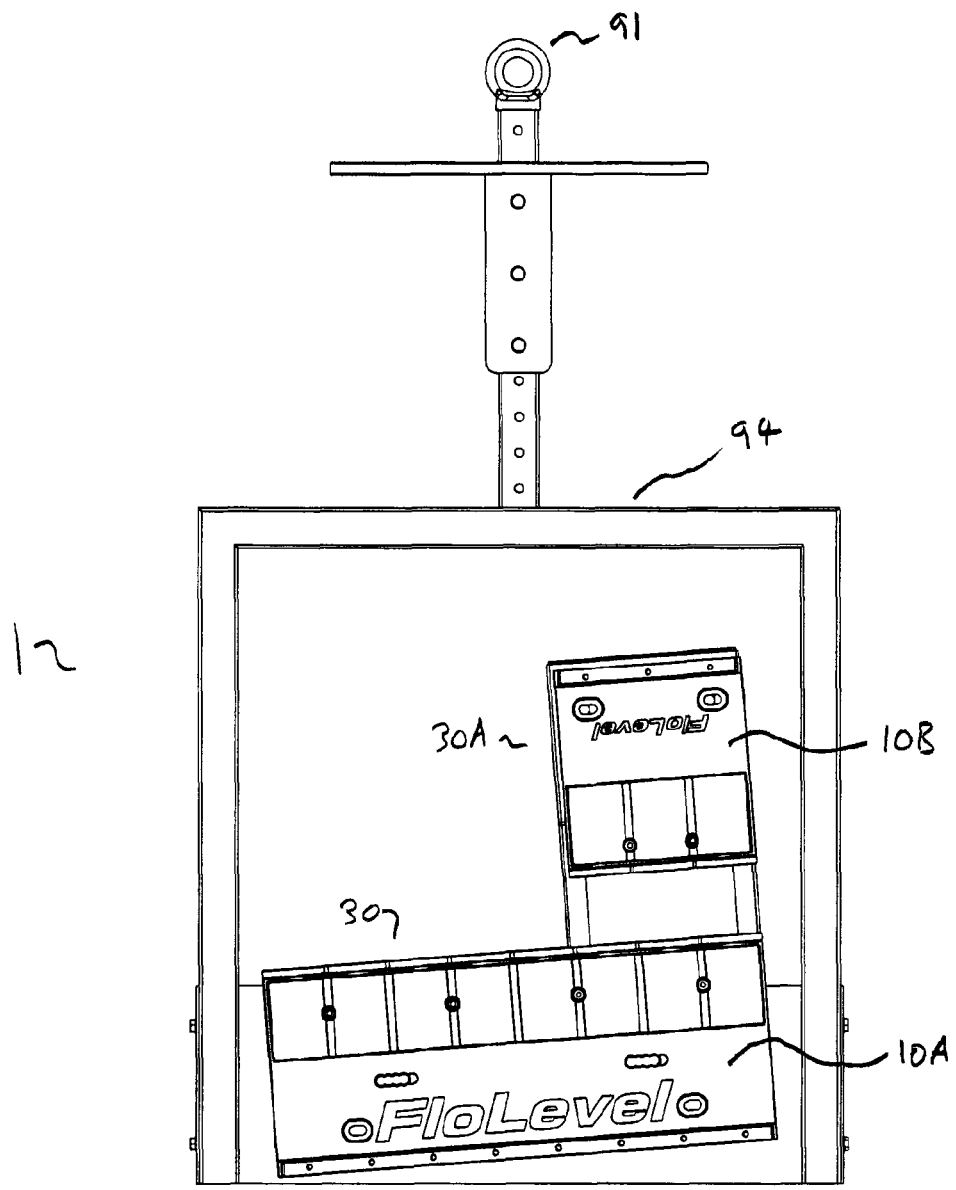
FIG. 27 is a side elevation view of the arrangement shown in FIG. 26.

FIGS. 26 and 27 show an alternative arrangement of the at least one array to that shown in FIGS. 24 and 25, where the primary and secondary arrays 30, 30A are mounted so as to be tilted from a horizontal position on a support 94, which is configured to allow such a tiled position. In this embodiment, the primary array is a parallel offset array 10A and the secondary array is a shorter array 10B. Such an arrangement of a sensor/sensor system/sensing method 1 can be used for determining characteristics of signals indicative of properties of substances, say, in a flotation tank, where the arrays are lowered into a tank containing the substances, and suspended at a top-most part of the tank. In one example, the tilt, which is either fixed or moveable, can be used to determine the property of froth height very accurately/precisely because the froth will cover only some of the transducers 12 in the secondary array 30A, while other(s) of the transducers 12 will be in the air layer. If the support 94 is raised and/or lowered, perhaps oscillating up and down, it is possible to use the feedback provided by the transducer's signal characteristic to determine froth height. Alternatively, rather than raising and lowering the support, it is possible to tilt the array 30A between, say, a horizontal orientation and a tilted orientation to determine froth height by the feedback received from the transducer signal characteristic. Similarly, the primary array can be used to determine the liquid height as it will be positioned so as to have some transducers in the liquid and some transducers in the froth, thus having those transducers produce differing signal characteristics.

Figure 28:
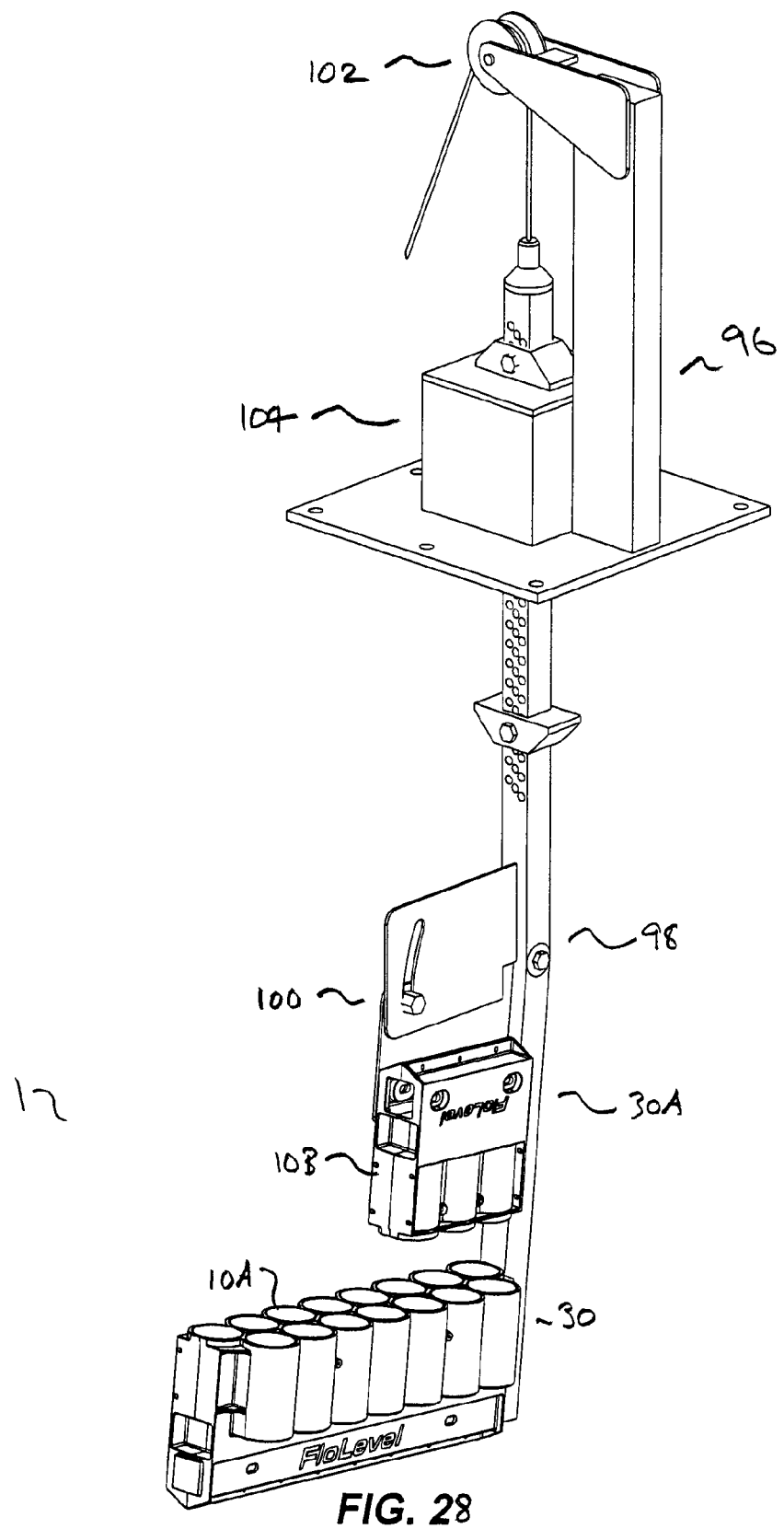
FIG. 28 is a perspective view of an arrangement similar to that shown in FIGS. 26 and 27, but on an alternative type of support; and, FIG. 29 is a side cross-sectional view of the arrangement shown in FIG. 28, shown in a flotation tank.

FIG. 28 shows an alternative arrangement for tilt mounting of the primary 30 and secondary 30A arrays, having a support 96 with a rotating joint 98 and a double plate and slotted bolt holding means 100 for tilting the arrays. The support is adjustably hung from a pulley and cable system 102. The support further includes stabilizing means 104.

Figure 29:
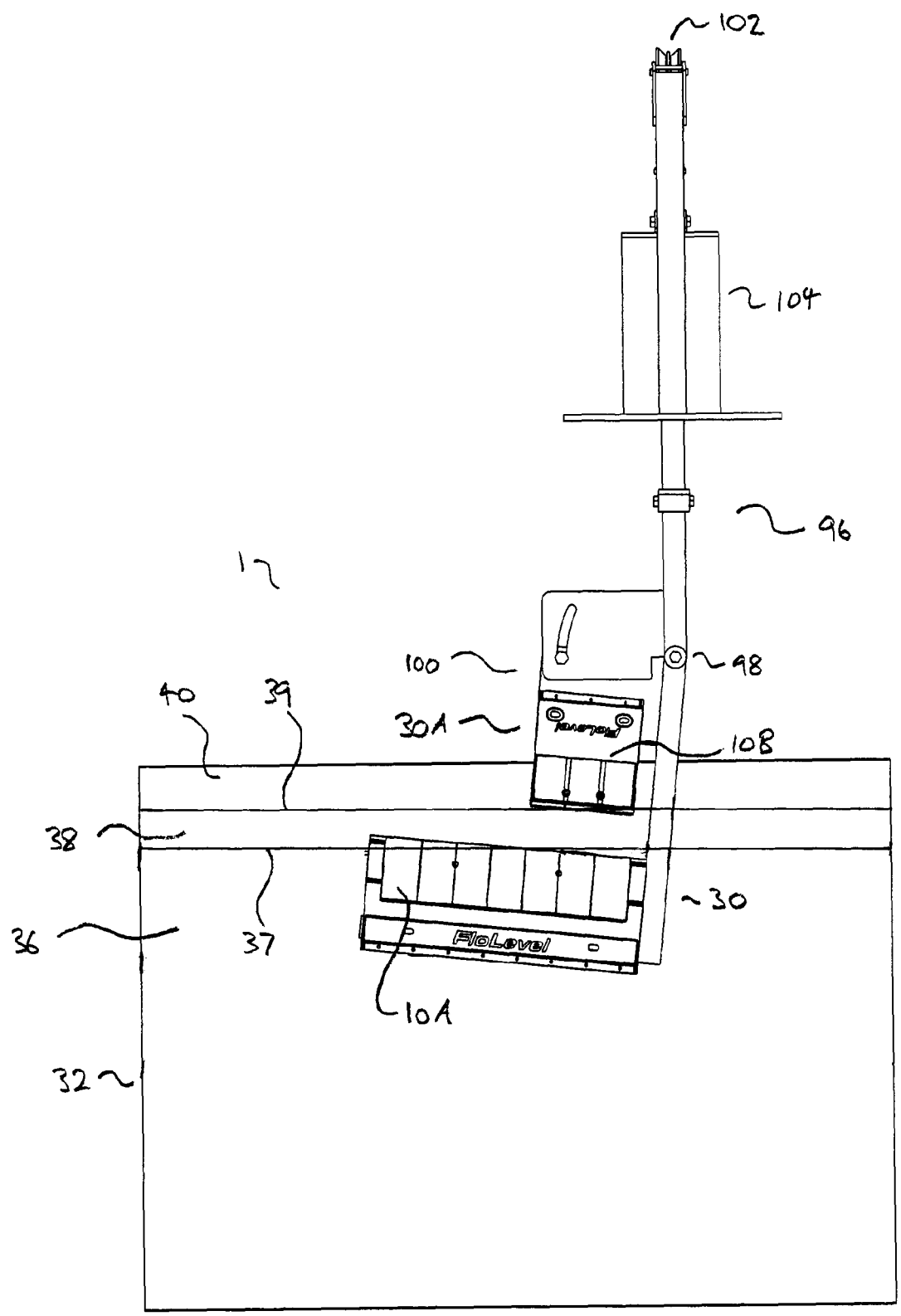

FIG. 29 shows the arrangement from FIG. 28 in a flotation tank 32, where the arrays 30, 30A are tilted from horizontal. As described above, the tilting can provide a way to achieve accurate and/or precise measurements by determining characteristics of signals produced by substances in the tank, depending on where each transducer is located with respect to the substances.

In one embodiment, the invention uses an array of low frequency acoustic sonar transducers. In certain applications, the frequency may be 12.5 kHz, in other applications the frequency of the transducers may be 25 kHz. One function of the transducers is to perform a "self-cleaning" operation, such that there is little or no requirement for an operator to intervene in the cleaning process. The cleaning is performed by generating a signal to create rarefaction and thus cavitation.

It will be appreciated that sonar technology has been used in flotation operations in mining so as to enhance the ability of the reagents to scavenge the mineral more efficiently. However, sonar technology has never been used for measurement of levels of substances in an in situ process application, nor for measurement of other properties of substances, such as density or speed/velocity of movement.

As mentioned above, the transducers may use various operating frequencies as required for the particular operating process conditions. In embodiments, the array may be expandable so as to be an extended array, and can be extended so as to fit various flotation tank/flotation cell sizes.

In operation, the sensor array may be installed such that the top transducer is in line with the launder overflow of the flotation tank. In such an installation, a bracket supporting the array may be adjustable for the purposes of aligning the sensor array with the launder overflow position.

In embodiments of the sensor, the acoustic transducer in the sensor array may be connected back to a controller, via a communication bus. The controller controls the transducer array such that each transducer is "pulsed" in sequence. In this regard, the term "pulsed" is used to indicate that a transducer is in generation mode, wherein it is generating an acoustic signal, also referred to as an analysis signal.

In one operation, each of the transducers is pulsed in a sequence so as to form an array cleaning scan, wherein each transducer produces a signal which is suitable for creating cavitation in front of the transducer, so as to "self-clean". In this regard, the cavitation will "self-clean" the "active" diaphragm of the pulsed transducer.

In an embodiment, the array cleaning scan is done at the same time as an array scan, wherein the array scan is for detecting at least one characteristic for each of a plurality of substances. In an example array scan, the transducers mounted either side of the active transducer (the transducer in generation mode) will be operating as receivers (transducers in reception mode).

In certain substances, the transducers in reception mode will not only detect the acoustic (analysis) signal of the transducer in generation mode, but will also detect any background frequency that is within the filter range of the transducers in reception mode. In an embodiment, the controller scans each transducer on a time base, so that over a time period (a single array scan), all transducers are self-cleaned, as well as receivers being checked for signal amplitude.

It will be appreciated that transfer of acoustic signals in a liquid has an extremely high efficiency, whereas transmission of acoustic signals in froth is extremely poor. This is due to air bubbles in the froth acting as a sound absorber. Accordingly, transducers that are immersed in a liquid layer in a flotation tank will receive a high amplitude acoustic signal, which indicates presence of the liquid. The amplitude of the received acoustic signal will be directly proportional to the surface area of the diaphragm of the transducer in reception mode which is covered by the liquid in the liquid layout.

In this regard, in such an embodiment, during the array scan, a transducer is pulsed, with two transducers either side of the pulsed transducer acting as receivers. If the transducer below the pulsed transducer receives a high amplitude acoustic signal, it is determined that the liquid is present at that level. If the transducer above the pulsed transducer receives a high amplitude acoustic signal, then it may be deemed that the liquid level is above the height of the transducer above the pulsed transducer. However, if the transducer above the pulsed transducer receives a signal smaller than, for example, half the amplitude of the high amplitude signal, then it may be deemed that the liquid height at the level of the transducer above the pulsed transducer. It will be appreciated that this has an accuracy of approximately half the diameter of the diaphragm of a transducer in the array.

Array scan times will vary depending on the number of sensor array components in an extended array.

In an embodiment, the controller may provide an analogue output signal output to pulse any transducer in the array where it is determined that that transducer is pulsing into a liquid layer.

The sensor may also include visual display equipment on which is indicated the height of the liquid layer (the liquid layer/froth layer interface). The display may also show trends of movement of the height of the liquid layer/froth layer interface.

In an embodiment, transducers above the liquid layer will be immersed in the froth layer. These transducers may be calibrated to detect the difference between froth at the face of the diaphragm of the respective transducer, and air at the face of the respective diaphragm.

In operation of a flotation tank, it is important to be able to detect whether the froth is overflowing on the launder. This can be determined by being able to measure the froth layer/gaseous layer interface, thus determining, approximately, the height of the top of the froth layer.

In such a setup, if the froth is flowing into the launder, the respective transducers will detect the froth based on a minimal signal/noise ratio. The height of the top of the froth layer may also be displayed on the monitoring equipment. An analogue output from the controller is also possible for the froth height condition.

When the transducers in the array of the sensor are not covered in liquid or froth, then the signal received by the transducers in reception mode will indicate the transducer as being in free air. Depending on the height of the transducer detecting itself as being in free air, this may be an indication that the flotation tank/flotation cell is not functioning properly, with the froth not flowing into the launder. In such a situation, it is is possible to operate alarms to alert people to this situation.

In an optional embodiment, an additional transducer (or transducers) is mounted directly opposite the top-most transducer (or top-most transducers) in the transducer array. This setup will provide an output, which is directly proportional to the density of the froth situated between the top-most transducer and the additional transducer. It will be appreciated that at least two oppositely facing transducers are required, so that the signal produced between the transducers in powerful enough to penetrate through the froth situated there-between. In this embodiment, the frequency of the two oppositely situated transducers could vary according to the possible density range of the froth, based on understood service conditions. For example, froth density of a coal flotation tank is low, whereas froth density of copper, zinc, gold, or lead flotation tanks is relatively high in comparison.

Where there is a configuration with an additional transducer oppositely facing the top-most transducer in the transducer array, these transducers may also share the pulsed sequence for the "self-cleaning". In another optional embodiment, the two oppositely facing transducers may provide indications of any Doppler effect, such that the froth flow past these transducers can be determined. In such circumstances, the display equipment could also show froth density and froth flow speed.

In an embodiment, the drive circuit for the transducers may include multiple stages, wherein: each transducer will be scanned individually (multiplexed), via a ModBus communications connection to the controller; each transducer will be pulsed in sequence at two different amplitudes, being an ultrasonic cleaning high amplitude pulse to clean the diaphragm of the transducer from build-up, along with a lower amplitude pulse for measuring (detecting the substance, interface heights, etc.);

The transducer mounted directly above the transducer that is pulsed, operates as a receiver (in reception mode), listening for the operating frequency of the pulsed transducer (in generation mode), and the matching background noise that is within the specification of the bandwidth filters of the receiving transducer; and the controller checks the amplitude of the received amplitude signal from the receiving transducer to verify if (a) a low amplitude signal or no signal has been received, thus indicating froth, or (b) a high amplitude signal has been received, indicating the liquid layer being present.

Accordingly, embodiments of the present invention may provide the following advantages:

The sensor/sensor system/sensing method will self-clean and provide reliability, where other technologies have failed;

The sensor/sensor system/sensing method may provide a level of flexibility so that additional process variables can be used in the process control PID loop control of the flotation cell/flotation tank, that are not otherwise available;

Flotation cells/flotation tanks are knowing for generating major profits, if they are working efficiently, and the present sensor/sensor system/sensing method should assist in that efficiency;

Other technologies (such as upgraded conductivity probes) with signal feedback, still do not address the mining process environmental issues and operator intervention is still required. Such other technologies do not have a self-cleaning function, but have instead relied on signal compensation for built-up issues, so as to be able to continue working;

In mining sites, an ore body generally have variable complexities, so a technology which self-cleans and is not reliant on dielectric constant changes will be useful;

In embodiments, the sensor/sensor system/sensing method uses variation in signals between a liquid layer and a froth layer and an air layer, so that the technology is not reliant on variabilities of ore body complexities; and Such technology also needs to be able to work with various reagents, frothers, etc. which can be oil based (such as diesel, or similar), and such substances tend to build-up on sensors. Particularly in the oil sands industry, there are high amounts of bituminous material in suspension in the froth. Other technologies have not been capable of operating in such an environment.

In embodiments, the sensor/sensor system/sensing method may also provide other advantages such as being able to operate in conditions where there is high agitation and aeration of substances in a flotation cell/flotation tank. Further, the sensor/sensor system/sensing method may be simple to install and calibrate, has no moving parts to replace, is not density sensitive and is not dielectric sensitive. The technology may provide a froth height measurement, so as to provide feedback as to whether the flotation cell/flotation tank has froth carryover (which is necessary for proper operation).

Further, the sensor/sensor system/sensing method may provide a density measurement of the froth, wherein the technology can be used to alert operators to:

Low density froth, wherein the flotation process required reagent adjustment and/or air velocity adjustment;

High density froth, wherein the froth may be liable to collapse on itself, such that it does not flow over the launder, and which may require air velocity adjustment.

It will be appreciated that the sensor/sensor system/sensing method use acoustic technology (transducers) for generating pressure waves in a pulse, so as to create cavitation and provide ultrasonic cleaning (self-cleaning). In this regard, ultrasonic cleaning is dependent on frequency, for example, higher frequency (30 kHz, 40 kHz, to 100 kHz and higher, that is, shorter wavelength) may be used. The higher the frequency, the smaller the particle that can be cleaned or removed. However, higher frequency transducers also produce a lower amplitude pressure wave effect.

In contrast, lower frequency transducers (for example, 25 kHz, 20 kHz, 15 kHz, 12 kHz, 10 kHz and 5 kHz) have longer wave lengths and higher amplitude pressure wave effects, which has been found to enhance the sonic cleaning effect. Moreover, it has been found that transducers with frequencies of 25 kHz and lower may be optimal for conditions in a flotation cell/flotation tank.

It has also been found that acoustic transducers change in dimension as frequency changes in this regard; a low frequency transducer (5 kHz) may be twice the size of a higher frequency transducer (20 kHz). In embodiments, each transducer has a centre frequency that it is tuned to, and the transducer includes a mass that is attached to either side of a couple of piezo crystals.

Embodiments of the present invention may use transducers operating from about 50 kHz to 5 kHz. However, the selection of the transducer would usually be dependent on environmental and operating conditions in which the sensor/sensor system/sensing method is to be applied.

In some embodiments, the sensor/sensor system/sensing method will use either 25 kHz or 12.5 kHz transducers in the transducer arrays. It will be understood that a 12.5 kHz transducer is physically larger than a 25 kHz transducer, so requiring larger housing. In embodiments, each transducer array (or extended array component) will have eight transducers. The controller for such a sensor/sensor system/sensing method will be adapted to operate with the particular transducers being used.

In an embodiment, there is a further transducer placed in the flotation cell/flotation tank, so as to be oppositely facing the top-most transducer in the array, or the extended array. Such an embodiment may be able to measure froth density as a function of signal amplitude between the two oppositely facing transducers. Further, such an embodiment may be able to detect froth movement, as such froth movement produces a Doppler effect between the two transducers. In such an embodiment, the extra transducer may always be the "sender" for self-cleaning purposes, whereas the top-most transducer in the array, or the extended array, is the "receiver", but will also function as part of the array before the self-cleaning and array scans.

In embodiments, transducers may be commercial off-the-shelf (COTS) type products. Often such transducers have their own outer protection and/or casing, which may be suitable for mining applications. The sensor/sensor system/sensing method may provide additional protection by using an outer casing our housing, which also provides protection for any electronics, along with providing extra protection for the transducers. In some embodiments, spacers in the outer casing/housing may be filled with a substance, such as the epoxy resin, for reinforcement of the casing/housing in the high pressure conditions of the flotation cell/flotation tank.

Where it is desired to provide an extended array, the array components (transducer arrays) are connected with each other so as to form an extended longitudinal array. In such embodiment, there may be provided a bus connection between the array components (array modules). It will be understood that any such bus connections, along with all other electronic components situated in the flotation cell/flotation tank, must be protected against the conditions produced by substances in the flotation cell/flotation tank, and so must be enclosed in the array components, and must also be enclosed when the array components are connected together to form the extended array.

In an embodiment, the sensor may include a housing for the sensor array. The housing may be made from glass-reinforced propylene. It has been found that propylene assists in avoiding scale build-up, and is therefore easier for cleaning.

In an embodiment, the transducer array, or extended array, may be pulsed so that all transducers in the array produce cavitation for self-cleaning at the same time. This facility may be useful for inter-operation cleaning purposes.

Principles of Operation for Detecting Liquid Layer (Slurry/Pulp), Froth Layer and Air Layer Characteristics (Signal Characteristics) Using Acoustic Transducers Slurry Pulp Detection:

The array of transducers (8 per array or array component in embodiments) are frequency sized first on their acoustic cleaning capability (the ability to create cavitation) so that they can operate in the flotation cell/flotation tank environment, which includes substances that have a tendency to scale and build up on anything that is intrusive in the vessel.

In one embodiment, the operation includes only one transducer pulsing at a time for a given duration. This duration can vary, dependent on the amplitude of the pulse applied. Generally, the longer the duration in pulse time, the higher the pulse amplitude, the greater the cleaning cavitation for the transducer diaphragm.

In such embodiment, when a transducer is pulsed, the transducers either side of the pulsed transducer act as receivers. They are passive in nature, and during the receive cycle, they do not clean. The sound signal is transmitted at a very wide angle into the flotation cell. Typically, the sound will not travel easily through the liquid, as the bubbles that are being generated in the flotation cell/flotation tank during aeration and/or agitation, will attenuate the signal before it has reached the other side of the flotation cell/flotation tank. The wide angle of the pulsed beam in liquids is enough to be detected by the receiver transducers, if the transducers are immersed in the liquid slurry.

The selection of transducer frequencies are application dependent. The flotation cell/flotation tank also produces a range of background frequencies that emanate from aeration noise, agitation noise, pumps, dart valves, etc. If the background noise, matches the operating frequency of the transducers, the receivers may also act as hydrophones and may increase the efficiency of detecting the liquid slurry. This is especially so, in the liquid slurry. As the background noise is random, it cannot be relied upon, but it may enhance performance.

The sensor/sensor system/sensing method multiplexes the transducer pulsing and receiving sequences. The sensor/sensor system/sensing method detects, which transducer is pulsing and which transducers are receiving. This way the sensor/sensor system/sensing method detects if the receivers and sender transducer are immersed in liquid slurry or not and outputs a signal proportional to the signal status based on whether the receiver receives a signal or not.

Froth Detection:

Froth in a flotation cell/flotation tank, is made up of thousands of different size air bubbles. The fact that there are thousands of impedance changes to sound transmission, based on the number of bubbles in front of the pulse transducer, suggests that the pulse signal will be attenuated greatly by the froth, to the point, where most acoustic frequencies in the acoustic transducer spectrum will fail to operate in the froth. It should therefore be possible to identify whether the transducers are immersed in froth or liquid slurry as the signal received in liquid may be hundreds of times greater in amplitude than for froth.

Air Detection:

It is also necessary to identify if the flotation cell/flotation tank is not in "carryover". Carryover is the spill-over of froth into the launder to take the froth concentrate to the concentrate thickener.

If the froth is in carryover, the froth is spilling into the launder and the flotation cell is working. If the froth is not in carryover, them an air gap between the froth and launder is seen. This should also be detected. This affects the top two transducers down in the top array component only. Transducers, when pulsed, move with the energy applied, although it is very subtle in movement. After the pulse is removed, there is residual energy still on the transducer, because of its mass. This creates what is known as "transducer ringing", or ring-down. The ring-down characteristics vary with dependence on frequency, because the mass changes with each transducer frequency. The sensor/sensor system/sensing method detects the different ring-down characteristics between the transducer immersed in froth and the transducer in free air. The transducer in free air will have a longer ringing characteristic than froth immersed transducers. The free air transducer will also exhibit other signals (having characteristics) reflected off the flotation structure that can also be utilized for verifying that it is in "free air".

Both the standard 25 Khz and 12.5 Khz transducers that are used in embodiments will detect pulsed echo's transmitted through air.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. A sensor for determining at least one characteristic of at least one substance in a flotation tank, the sensor comprising:

a single array including a plurality of acoustic transducers comprising a single housing disposed within the interior of the flotation tank, the array comprising two or more adjacent and parallel lines of transducers, wherein the transducers in one line are offset with respect to the transducers in an adjacent parallel line of transducers such that the transducers in the one line are situated in a space between transducers of the adjacent parallel line, and wherein the transducers of the array are facing in the same direction, each transducer within the array being capable of selectively operating in a generation mode or a reception mode such that during a scan of the array, at least one transducer within the array is in the generation mode and in communication with at least one other transducer within the array that is in the reception mode;

a controller:
for controlling each transducer within the array to be selectively in the generation mode for generating an analysis signal, or in the reception mode for receiving an analysis signal reflected from one or more of a plurality of substances in the flotation tank to produce an output signal, and,
for controlling the sensor to perform scans of the array, each scan having a plurality of scan steps, such that, during each scan step, at least one transducer within the array is in the generation mode and at least one other transducer within the array is in the reception mode; and a processor for processing one or more signals receivable from one or more of the controller, the at least one transducer in the generation mode and the at least one transducer in the reception mode to determine the at least one characteristic from the one or more signals.

2. A sensor according to claim 1, wherein the controller is further adapted to control each transducer to be selectively in a cleaning mode for generating a signal which forms cavitation in one or more of the at least one substance, such that, if one or more of the substances has accumulated on the transducer, the cavitation removes at least some of the accumulation from the transducer.

3. A sensor according to claim 1, wherein one of the one or more signals receivable by the processor is a signal from either the controller or a transducer of the array in generation mode indicating the transducer is in generation mode and generating an analysis signal,
- wherein one of the one or more signals receivable by the processor is a signal from either the controller or a transducer of the array in reception mode indicating the transducer is in reception mode and able to receive an analysis signal,
- wherein one of the one or more signals receivable by the processor is an output signal from a transducer of the array in reception mode, and,
- wherein one of the one or more signals receivable by the processor is a signal from a transducer of the array in generation mode indicating the transducer is producing ring-down.

4. A sensor according to claim 1, wherein the array comprises two adjacent and parallel lines of transducers.

5. A sensor according to claim 4, wherein the offset is at least a half width of a transducer of the array.

6. A sensor according to claim 1, wherein the array comprises a plurality of housings connected end to end to form an extended array with a proximal-most transducer and a distal-most transducer.

7. A sensor according to claim 1, wherein the controller is further adapted to control each scan step such that only one transducer is in the generation mode.

8. A sensor according to claim 7, wherein the controller is further adapted to control each scan to be in order from the proximal-most transducer in generation mode to the distal-most transducer in generation mode.

9. A sensor according to claim 1, wherein the controller is further adapted to control each scan step such that the at least one other transducer in reception mode comprises at least one transducer adjacent a transducer in generation mode.

10. A sensor according to claim 1, wherein the array comprises a proximal-most transducer and a distal-most transducer, and the controller is further adapted to control each scan step such that the at least one other transducer in reception mode includes one proximal adjacent transducer and one distal adjacent transducer to a transducer in generation mode,
- wherein, when the proximal-most transducer is in generation mode only the one distal adjacent transducer is in reception mode, and
- wherein, when the distal-most transducer is in generation mode only the one proximal adjacent transducer is in reception mode.

11. A sensor according to claim 1, wherein the controller is further adapted to control each scan to include sufficient scan steps such that, during the scan, each of the transducers is at least once in a generation mode and at least once in a reception mode.

12. A sensor system for determining at least one characteristic of each of a plurality of substances in a flotation tank, wherein each of the substances comprises a layer in the flotation tank, wherein each layer has at least one interface with an adjacent layer, and wherein each interface has a changeable height in the flotation tank, the sensor system comprising:
- a single array located within, and/or near within the interior of the flotation tank, the array comprising a plurality of acoustic transducers comprising a single housing disposed within the interior of the flotation tank, the plurality of acoustic transducers arranged in two or more adjacent and parallel lines, wherein the transducers in one line are offset with respect to the transducers in an adjacent parallel line of transducers such that the transducers in the one line are situated in a space between transducers of the adjacent parallel line, and wherein the transducers of the array are facing in the same direction, the array further comprising a proximal-most transducer and a distal-most transducer, each transducer within the array being capable of selectively operating in a generation mode or a reception mode such that during a scan of the array, at least one transducer within the array is in the generation mode and in communication with at least one other transducer within the array that is in the reception mode;
- a controller:
  - for controlling each transducer to be selectively in the generation mode for generating an analysis signal for transmission towards at least one substance located in front of the transducer in the flotation tank, or the reception mode for receiving an analysis signal reflected from one or more of the plurality of substances in the flotation tank to produce an output signal, and,
  - for controlling the sensor to perform scans of the array, each scan having a plurality of scan steps, such that, during each scan step, at least one transducer within the array is in the generation mode and at least one other transducer within the array is in the reception mode; and,
- a processor for processing one or more signals receivable from one or more of the controller, at least one transducer of the array in the generation mode, and at least one transducer of the array in the reception mode to determine the at least one characteristic from the one or more signals.

13. A sensor system according to claim 12, wherein the controller is further adapted to control each transducer to be selectively in a cleaning mode for generating a signal which forms cavitation in one or more of the at least one substance, such that, if one or more of the substances has accumulated on and/or near the transducer, the cavitation removes at least some of the accumulation from on and/or near the transducer.

14. A sensor system according to claim 12, wherein one of the one or more signals receivable by the processor is a signal from either the controller or a transducer of the array in generation mode indicating the transducer is in generation mode and generating an analysis signal,
- wherein one of the one or more signals receivable by the processor is a signal from either the controller or a transducer of the array in reception mode indicating the transducer is in reception mode and able to receive an analysis signal,
- wherein one of the one or more signals receivable by the processor is an output signal from a transducer of the array in reception mode, and, wherein one of the one or more signals receivable by the processor is a signal from a transducer of the array in generation mode indicating the transducer is producing ring-down.

15. A sensor system according to claim 12, wherein the array comprises two adjacent and parallel lines of transducers.

16. A sensor system according to claim 15, wherein the offset is at least a half width of a transducer.

17. A sensor system according to claim 12, wherein the array comprises a plurality of housings connected end to end to form an extended array.

18. A sensor system according to claim 12 wherein the controller is further adapted to control each scan step such that only one transducer is in the generation mode.

19. A sensor system according to claim 18, wherein the controller is further adapted to control each scan to be in order from the proximal-most transducer in generation mode to the distal-most transducer in generation mode.

20. A sensor system according to claim 12, wherein the controller is further adapted to control each scan step such that the at least one other transducer in reception mode includes at least one transducer adjacent a transducer of array in generation mode.

21. A sensor system according to claim 12, wherein the controller is further adapted to control each scan step such that the at least one other transducer in reception mode includes one proximal adjacent transducer and one distal adjacent transducer to a transducer of the array in generation mode,
wherein, when the proximal-most transducer is in generation mode only the one distal adjacent transducer is in reception mode, and
wherein, when the distal-most transducer is in generation mode only the one proximal adjacent transducer is in reception mode.

22. A sensor system according to claim 12, wherein the controller is further adapted to control each scan to include sufficient scan steps such that, during the scan, each of the transducers is at least once in a generation mode and at least once in a reception mode.

23. A sensor system according to claim 12, wherein the array is arranged vertically in the flotation tank, such that the proximal-most transducer comprises a top-most transducer and the distal-most transducer comprises a bottom-most transducer, and wherein, when the flotation tank is in normal operation, the top-most transducer is in a top-most layer and the bottom-most transducer is in a bottom-most layer.

24. A sensor system according to claim 12, wherein the plurality of substances in the layers comprise: a liquid substance in a bottom-most layer, a froth substance in an intermediate layer and a gaseous substance in a top-most layer, such that the interfaces include: a liquid layer/froth layer interface, and a froth layer/gaseous layer interface.

25. A sensor system according to claim 24, wherein the liquid layer is a slurry or a pulp containing at least one mineral, the froth layer contains, in suspension, a more refined mineral than in the liquid layer recovered from the mineral in the liquid layer, and the gaseous layer is air, and wherein, in operation, the liquid layer is agitated and/or aerated such that bubbles ascend there-through to create the froth layer.

26. A sensor system according to claim 24, wherein, when the processor receives an output signal at or near a first predetermined amplitude from a transducer in reception mode, the processor determines the output signal having a characteristic indicative of the liquid layer, and wherein the processor is configured to output an indicator that the transducer is located in the liquid layer.

27. A sensor system according to claim 24, wherein, when the processor receives an indicator that a transducer of the array is generating an analysis signal, and receives an indicator that another transducer is in reception mode and able to receive the analysis signal, and receives either no output signal or an output signal at or near a second predetermined amplitude from the transducer in reception mode, the processor determines the signals to have a characteristic distinguishing of the froth layer, and wherein the processor is configured to output an indicator that at least one of the transducers is located in the froth layer.

28. A sensor system according claim 24, wherein, when the processor receives an indicator that a transducer of the array in generation mode is producing a ring-down signal, the processor determines the signal to have a characteristic distinguishing of the gaseous layer, and wherein the processor is configured to output an indicator that at least one of the transducers is located in the gaseous layer.

29. A sensor system according to claim 24, wherein, during a scan step, the processor receives an indicator that a first transducer of the array is generating an analysis signal, and receives an output signal having a first predetermined amplitude from a higher adjacent transducer of the array to the transducer generating the analysis signal; and, during a subsequent scan step, the processor receives an indicator that the higher adjacent transducer is generating an analysis signal and receives either no output signal or an output signal at a second predetermined low amplitude from the first transducer, the processor determines the signals to have a characteristic distinguishing of the liquid layer/froth layer interface, and wherein the processor is configured to output an indicator that the transducers are located about the liquid layer/froth layer interface.

30. A sensor system according to claim 24, wherein, during a scan step, the processor receives an indicator that a first transducer of the array is generating an analysis signal, and receives an output signal having a first predetermined amplitude from a lower adjacent transducer of the array to the transducer generating the analysis signal; and, during a subsequent scan step, the processor receives an indicator that the lower adjacent transducer is generating an analysis signal and receives either no output signal or an output signal at a second predetermined amplitude different from the first transducer, the processor determines the signals to have a characteristic distinguishing of the liquid layer/froth layer interface, and wherein the processor is configured to output an indicator that the liquid layer/froth layer interface is located at a height median the two transducers.

31. A sensor system according to claim 24, wherein, when the processor receives an indicator that a first transducer of the at least one array in generation mode is producing ring-down; and, during a subsequent scan step, the processor receives either no output signal or an output signal at a second predetermined low amplitude from a lower adjacent transducer of the at least one array the processor determines the signals to be a distinguishing characteristic of the froth layer/gaseous layer interface, and wherein the processor is configured to output an indicator that the froth layer/gaseous layer interface is located at a height median the two transducers.

32. A method of sensing for determining at least one characteristic of at least one substance in a floatation tank, the method comprising:
disposing a sensor comprising a single array of a plurality of acoustic transducers, the array comprising two or more adjacent and parallel lines of transducers located in a single housing, wherein the transducers in one line are offset with respect to the transducers in an adjacent parallel line of transducers such that the transducers in the one line are situated in a space between transducers of the adjacent parallel line, and wherein the transducers of the array are facing in the same direction, the array disposed within, and/or near the interior of the flotation tank, each transducer being capable for selectively operating in a generation mode or a reception mode such that during each scan of the array at least one transducer in the array is in the generation mode and in communication with at least one other transducer in the array that is in the reception mode;

controlling, using a controller, each transducer of the array to be selectively in the generation mode for generating an analysis signal, or in the reception mode for receiving an analysis signal reflected from the at least one substance to produce an output signal, controlling, using the controller, the sensor to perform scans of the array, each scan having a plurality of scan steps, such that, during each scan step, at least one transducer of the array is in the generation mode and at least one other transducer from the array is in the reception mode, and processing one or more signals receivable from one or more of the controller, the at least one transducer in the generation mode and the at least one transducer in the reception mode to determine the at least one characteristic from the one or more signals.

33. A sensor for determining at least one characteristic of at least one substance in a flotation tank, the sensor comprising:

a single array including a plurality of acoustic transducers comprising a single housing disposed within the interior of the flotation tank, the array comprising two or more parallel lines of transducers, wherein the transducers in one line are offset with respect to the transducers in an adjacent parallel line of transducers, and wherein the transducers of the array are facing in the same direction, each transducer within the array being capable of selectively operating in a generation mode or a reception mode such that during a scan of the array, at least one transducer within the array is in the generation mode and in communication with at least one other transducer within the array that is in the reception mode;

a controller:
for controlling each transducer within the array to be selectively in the generation mode for generating an analysis signal, or in the reception mode for receiving an analysis signal reflected from one or more of a plurality of substances in the flotation tank to produce an output signal, and, for controlling the sensor to perform scans of the array, each scan having a plurality of scan steps, such that, during each scan step, at least one transducer within the array is in the generation mode and at least one other transducer within the array is in the reception mode; and a processor for processing one or more signals receivable from one or more of the controller, the at least one transducer in the generation mode and the at least one transducer in the reception mode to determine the at least one characteristic from the one or more signals.

34. A sensor according to claim 33, wherein the controller is further adapted to control each transducer to be selectively in a cleaning mode for generating a signal which forms cavitation in one or more of the at least one substance, such that, if one or more of the substances has accumulated on the transducer, the cavitation removes at least some of the accumulation from the transducer.

35. A sensor according to claim 33, wherein one of the one or more signals receivable by the processor is a signal from either the controller or a transducer of the array in generation mode indicating the transducer is in generation mode and generating an analysis signal, wherein one of the one or more signals receivable by the processor is a signal from either the controller or a transducer of the array in reception mode indicating the transducer is in reception mode and able to receive an analysis signal, wherein one of the one or more signals receivable by the processor is an output signal from a transducer of the array in reception mode, and, wherein one of the one or more signals receivable by the processor is a signal from a transducer of the array in generation mode indicating the transducer is producing ring-down.

36. A sensor according to claim 33, wherein the array comprises two adjacent and parallel lines of transducers.

37. A sensor according to claim 36, wherein the offset is at least a half width of a transducer of the array.

38. A sensor according to claim 33, wherein the array comprises a plurality of housings connected end to end to form an extended array with a proximal-most transducer and a distal-most transducer.

39. A sensor according to claim 33, wherein the controller is further adapted to control each scan step such that only one transducer is in the generation mode.

40. A sensor according to claim 39, wherein the controller is further adapted to control each scan to be in order from the proximal-most transducer in generation mode to the distal-most transducer in generation mode.

41. A sensor according to claim 33, wherein the controller is further adapted to control each scan step such that the at least one other transducer in reception mode comprises at least one transducer adjacent a transducer in generation mode.

42. A sensor according to claim 33, wherein the array comprises a proximal-most transducer and a distal-most transducer, and the controller is further adapted to control each scan step such that the at least one other transducer in reception mode includes one proximal adjacent transducer and one distal adjacent transducer to a transducer in generation mode, wherein, when the proximal-most transducer is in generation mode only the one distal adjacent transducer is in reception mode, and wherein, when the distal-most transducer is in generation mode only the one proximal adjacent transducer is in reception mode.

43. A sensor according to claim 33, wherein the controller is further adapted to control each scan to include sufficient scan steps such that, during the scan, each of the transducers is at least once in a generation mode and at least once in a reception mode.

* * * * *